United States Patent [19]
Yamamoto et al.

[11] Patent Number: 6,034,656
[45] Date of Patent: Mar. 7, 2000

[54] PLASMA DISPLAY PANEL AND METHOD OF CONTROLLING BRIGHTNESS OF THE SAME

[75] Inventors: Kumetsugu Yamamoto, Hyogo; Yukiharu Ito, Osaka; Akio Niwa, Osaka; Takao Wakitani, Osaka; Takuma Higashi, Osaka, all of Japan

[73] Assignees: Matsushita Electric Industrial Co., Ltd., Osaka, Japan; Matsushita Electronics Corporation, Osaka, Japan

[21] Appl. No.: 08/929,731

[22] Filed: Sep. 15, 1997

[30] Foreign Application Priority Data

Sep. 18, 1996 [JP] Japan ................................. 8-245839
May 5, 1997 [JP] Japan ................................. 9-022331

[51] Int. Cl.$^7$ ....................................................... G09G 3/28
[52] U.S. Cl. ............................. 345/60; 345/63; 345/147; 345/148
[58] Field of Search ................................. 345/60, 61, 62, 345/63, 65, 66, 67, 68, 69, 70, 72, 147, 148, 87; 315/169.4, 169.1

[56] References Cited

U.S. PATENT DOCUMENTS

| 5,187,578 | 2/1993 | Kohgami et al. ........................ 345/148 |
| 5,317,334 | 5/1994 | Sano ........................................ 345/148 |
| 5,475,448 | 12/1995 | Saegusa ................................... 345/63 |
| 5,757,343 | 5/1998 | Nagakubo ............................... 345/148 |

FOREIGN PATENT DOCUMENTS

| 0 614 321 | 9/1994 | European Pat. Off. . |
| 2 656 484 | 6/1991 | France . |
| 35 30 948 | 3/1987 | Germany . |
| 6-282241 | 10/1994 | Japan . |
| 7-170425 | 7/1995 | Japan . |
| 8-32903 | 2/1996 | Japan . |
| 8-146915 | 6/1996 | Japan . |

Primary Examiner—Xiao Wu
Attorney, Agent, or Firm—Merchant & Gould P.C.

[57] ABSTRACT

The plasma display panel having brightness display ranges comprising a gradation brightness display range which displays gradation brightness corresponding to the input signals under a preset input signal level and a constant brightness display range which displays a constant peak brightness greater than the maximum brightness corresponding to input signals greater than the preset input signal level. The plasma display panel can provide the gradation display up to the maximum brightness corresponding to the input signals up to the maximum input and provide the constant peak brightness corresponding to the peak level input by adding one additional weighting bit for the higher gradation. Consequently, a high quality brightness display with high mean value of the brightness and sufficiently high peak brightness can be achieved. Furthermore, the plasma display panel enhances the brightness weighting value and the value of γ for the reverse γ correction when the input signals go over the preset value and decrease the values to the original values when the input signals drop below the preset value. The plasma display panel can provide the gradation display up to the maximum brightness corresponding to the input signals up to the maximum input signal and provide the gradation display up to the peak brightness greater than the maximum brightness corresponding to the input signals over the maximum input signal. Consequently, high quality display with high brightness and high contrast without exceeding the maximum permissible power consumption can be achieved.

24 Claims, 25 Drawing Sheets

PLASMA DISPLAY PANEL AND METHOD OF CONTROLLING BRIGHTNESS OF THE SAME

BACKGROUND OF THE INVENTION

1. Field of the Invention

The present invention relates to a plasma display panel and a method of controlling the brightness of the plasma display panel used for a TV display, an advertisement indicator and so on.

2. Description of the Prior Art

Conventionally, the expression of gradation on a plasma display is achieved by introducing several sub-fields for weighting the brightness level in a field for a 1/60 second period as shown in FIG. 16(a). In FIG. 16(a), there are 8 sub-fields, sub1, sub2, . . . sub8, each of which consists of a writing period for data writing discharge, a maintaining period for luminescence display discharge and a erasing period for terminating the maintained discharge. The length of the maintaining period of each sub-field is different according to the weighting brightness level of each sub-field.

For example, each brightness of sub1, sub2, . . . sub8 is weighted as $2^0*B_0, 2^1*B_0, \ldots, 2^7*B_0$ ($B_0$: Unit brightness), and a 256 level gradation with linear characteristic can be controlled by the combination of above mentioned weighted sub-fields in a field. If the brightness weighting levels are multiplied, for example, as $A*2^0*B_0, A*2^1*B_0, \ldots, A*2^7*B_0$ (A>1), a 256 level gradation with linear characteristic which is A times the brightness of the standard level can be controlled by the combination of above mentioned multiplied weighted sub-fields in a field as shown in FIG. 16(b). Comparing FIG. 16(a) and FIG. 16(b), the lengths of all maintaining periods of FIG. 16(b) are A times longer than those of FIG. 16(a) because the weighting level is A times larger.

A TV signal has 1/2.2 γ characteristic. Therefore, the plasma display panel should apply the reverse γ correction to the display data which has the above-mentioned linear gradation display characteristic.

The block diagram of the conventional basic configuration for controlling the brightness of the plasma display is shown in FIG. 17. As shown in FIG. 17, the input signal is once converted to a 256 gradation weighted brightness level which has a linear characteristic by an 8 bit gradation display processing unit 31 whose maximum brightness is $M_1$, then converted to the output signal for the right brightness display with maximum brightness $M_1$ via a reverse γ correction unit 32 for the γ=2.2 correction.

In order to explain the above-mentioned data conversion in detail, the relationship between the TV input signal level and the display brightness is shown in FIG. 18. As shown in FIG. 18, the temporal relationship between the input signal level and the display brightness is shown as the chain line ①, whose characteristic is given by γ=1 by the 8 bit gradation display processing unit 31 shown in FIG. 17, then the relationship is corrected as the solid line ② which characteristic is given by γ=2.2 correction by the reverse γ correction unit 32. Consequently, the plasma display panel can display the data up to the maximum input signal level LM as the right brightness up to the maximum brightness $M_1$. In the same manner, if the brightness weighting levels are multiplied by A times as shown in FIG. 16(b), the temporal relationship between the input signal level and the display brightness is shown as the chain line ③ in FIG. 18, whose characteristic is given by γ=1 by the 8 bit gradation display processing unit 31 shown in FIG. 17. Then the relationship is corrected as the solid line ④ whose characteristic is given by γ=2.2 correction by the reverse γ correction unit 32. Consequently, the plasma display panel can display the data up to the maximum input signal level LM as the right brightness up to the maximum brightness $M_2$, which is A times larger than $M_1$.

As one embodiment of the conventional plasma display panel, a block diagram of a plasma display driving circuit and panel that achieves the above-mentioned brightness control is shown in FIG. 19. A plasma display panel unit 100 comprises an AC type plasma display panel 101 which has M column data electrodes $D_1, D_2, \ldots, D_M$ and N line pairs of the scanning electrodes and the maintaining electrodes $SC_1.SU_1, \ldots, SC_N.SU_N$ in a N*M matrix status, a data driver 102 for driving the M column data electrodes, and a scanning.maintaining.erasing driver 103 for driving the N line pairs of the scanning electrodes and the maintaining electrodes.

Next, the flow of the signal for driving the plasma display panel unit 100 is explained as follows. The level of an input signal is adjusted by a level adjusting unit 11 and inputted to an 8-bit A/D converter 12. The outputs of the A/D converter 12 are inputted to the reverse γ correction unit 13 for the γ=2.2 correction. After the γ correction, the data are stored in the frame memory 14, and outputted therefrom via the output processing unit 15 to drive the data driver 102. On the other hand, the timing pulse generator 17 is driven by the input signals via the synchronous separator 16. In addition, the output signals of the timing pulse generator 17 control the A/D converter 12 as well as a memory controller 18 and a driving timing generator 19. This timing pulse generator 17 sets the timing for the writing period, the maintaining period and the erasing period as well as the timing for deciding the length of the maintaining periods according to the brightness weighting level of each sub-field. The output signals of this driving timing generator 19 drive the scanning.maintaining.erasing driver 103 and feedback to the memory controller 18. The memory controller 18 controls the read-out and the read-in of the frame memory 14 in order to drive the data driver 102 via the output processing unit 15 by synchronizing to the output signals of the timing pulse generator 17 and the driving timing generator 19.

Consequently, the relationship between the TV input signal level and the brightness display of the plasma display panel 101 becomes the solid curved line ② shown in FIG. 18 processed by the circuit and the maximum brightness $M_1$ is outputted corresponding to the maximum input signal level LM. If the brightness weighting levels of the sub-fields are multiplied by A times for prolonging the length of the maintaining period by the driving timing generator 19, the relationship becomes the solid curved line ④ shown in FIG. 18 and the maximum brightness $M_2$ that is A times larger than $M_1$ is outputted corresponding to the maximum input signal level LM.

The above-mentioned conventional plasma display panel and method of controlling the brightness of the plasma display panel has the following problem.

FIG. 20 shows an example of an input signal for TV broadcasting. In order to display all variations of the input signal as the variation of the brightness on the plasma display panel, the signal level should be set as the peak input signal level LP and the constant of the brightness weighting value A and the value of γ should be adjusted for setting the maximum brightness level be $M_2$ shown in FIG. 18. By this setting and adjusting, the relationship between the input signal and the brightness of the plasma display panel has a linear characteristic as shown in FIG. 21. Consequently, the waveform of the brightness on the plasma display panel will be the same waveform of the corresponding input signal correctly shown as FIG. 22. Therefore, correct gradation display up to the peak brightness corresponding to the peak input signal level LP can be achieved. However, since the mean value of the input signal of the TV broadcasting is normally 20% to 30% of the peak input signal level LP, the mean value of the brightness will deteriorate. That is, the pictures on the plasma display will become dark as a whole.

This brightness deterioration problem seems to be solved by setting the constant of the brightness weighting value A and the value of $\gamma$ sufficiently large to enhance the mean value of the brightness. However, this enhancement will bring another serious problem in that the temperature rise of the plasma display panel becomes large and the temperature will be above the permissible temperature due to the augmentation of the electric power consumption. In order to keep the temperature of the plasma display panel within the permissible temperature, the maximum brightness level should be about 420 cd/m$^2$ at most. In this case, the mean value of the brightness on the plasma display panel corresponding to the TV broadcasting input signals will be at a low level of 80 cd/m$^2$ to 120 cd/m$^2$. When setting the input signal level to the A/D converter 12 in FIG. 19 to be up to the maximum input signal level LM (detection signal level LD) shown in FIG. 20 by means of the level adjusting unit 11, the relationship between the input signal level and the brightness display on the panel becomes the line shown in FIG. 23. In this case, the gradation display can be applied to the input signals up to the maximum input level LM, and the brightness applied to the input signals which surpass the maximum input level LM becomes the constant saturated maximum brightness shown as FIG. 24. Therefore, both the maximum brightness and the peak brightness become 420 cd/m$^2$, and there is no gradation between the brightness corresponding to the maximum input signal level LM and the brightness corresponding to the peak input signal level LP. This problem deteriorates the quality of the display on the plasma display panel.

Consequently, above-mentioned conventional plasma display panel and method of controlling the brightness of the plasma display have difficulty in achieving higher brightness display due to the limitation of the maximum brightness level in order to satisfy the maximum permissible power of the plasma display panel.

SUMMARY OF THE INVENTION

An object of the invention is to provide a plasma display panel and a method of controlling the brightness of the plasma display panel having high mean value of brightness display, a high brightness display higher than the maximum brightness level corresponding to the input signals which go beyond the maximum input signal level, low power consumption and low temperature rise.

In order to achieve this object and advantage of the invention, a first aspect of the plasma display panel and the method of controlling the brightness of the plasma display panel of the present invention is characterized by a gradation brightness display range which displays the gradation brightness corresponding to the input signals of the first input signal range under a preset input signal level and a constant brightness display range which displays a constant brightness over the maximum brightness of the gradation brightness display range corresponding to the input signals of the second input signal range over the preset input signal level.

According to this aspect and advantage of the invention, the gradation display up to the maximum brightness level is applied to the input signal whose level is below the maximum input signal level frequently seen in the normal TV broadcasting input signals and a higher constant brightness level created by adding one additional weighting bit is applied as a peak brightness corresponding to the peak level input signal occasionally seen in the normal TV broadcasting input signals. Therefore, the gradation display range can be expanded, the mean value of the brightness can be enhanced and high peak brightness can be achieved without exceeding the maximum permissible power consumption.

In the above-mentioned configuration, it is preferable that the period of continuous display on the constant brightness display range has a limitation in its length.

According to this aspect and advantages of the invention, the plasma display panel can restrain the power consumption within the permissible power consumption in the event the input signals over the preset input signal level are inputted continuously for a while.

In the above-mentioned configuration, it is preferable that the field of the scanning signal further comprises sub-fields for weighting the brightness display in order to display the gradation brightness in the gradation brightness display range and an additional sub-field independent of the sub-fields in order to display the constant brightness in the constant brightness display range.

According to this aspect and advantage of the invention, the plasma display panel can restrain the power consumption in the high brightness display, enhance the mean value of the brightness and achieve the high quality display by controlling the period of the additional sub-field for the constant high brightness display.

In the above-mentioned configuration, it is preferable that the scanning signal field further comprises sub-fields for weighting the brightness display in order to display the gradation brightness in the gradation brightness display range and an additional sub-field independent of the sub-fields in order to display the constant brightness in the constant brightness display range. When the input signals go beyond a preset level, the additional sub-field is added in the field, and when the input signals drop below the preset level, the added additional sub-field is cleared off from the field.

According to this aspect and advantage of the invention, the plasma display panel can enhance the mean value of the brightness and achieve high quality display by increasing the number of the sub-field dynamically when displaying the constant high brightness.

In the above-mentioned configuration, it is preferable that the timing for varying the number of the sub-fields is delayed in at least one of two cases, namely when the input signals go over the preset level or the input signals drop below the preset level.

According to this aspect and advantage of the invention, the plasma display panel can achieve flicker-less stable display even if the input signals that vary around the preset level are inputted continuously.

In the above-mentioned configuration, it is preferable that the value of the preset level for adding the additional sub-field and the value of the preset level for clearing the additional sub-field are different from each other.

According to this aspect and advantage of the invention, the plasma display panel can achieve chatter-less stable display even if the input signals near the preset level are input continuously.

In order to achieve this object and advantage of the invention, a second aspect of the plasma display panel and the method of controlling the brightness of the plasma display panel of the present invention is characterized by having the sub-fields for weighting the brightness display in the field and the signal processing circuit for the reverse γ correction, wherein both the value for the brightness weighting and the value of γ for the reverse γ correction are enhanced when the input signal level goes beyond a preset level, and both the value for the brightness weighting and the value of γ for the reverse γ correction are decreased when the input signal level drops below the preset level.

According to this aspect and advantages of the invention, a gradation display up to the maximum brightness level is applied to the input signal whose level is below the maximum input signal level frequently seen in the normal TV broadcasting input signals and gradation display up to the peak brightness level created by enhancing the constant of the brightness weighting value A and the value of γ is applied to the peak level input signal whose level is over the maximum input signal level occasionally seen in the normal TV broadcasting input signals. Therefore, the band of gradation display can be expanded, the mean value of the brightness can be enhanced and high level gradation corresponding to the peak level input signals can be achieved without exceeding the maximum permissible power.

In the above-mentioned configuration, it is preferable that the timing for varying the value of the brightness weighting and the value of γ is delayed in at least one of two cases namely when the input signals go over the preset level or the input signals drop below the preset level.

According to this aspect and advantage of the invention, the plasma display panel can achieve flicker-less stable display even if the input signals that vary around the preset level are inputted continuously.

In the above-mentioned configuration, it is preferable that the value of the preset level for enhancing the value of the brightness weighting and the value of γ and the value of the preset level for decreasing the value of the brightness weighting and the value of γ are different from each other.

According to this aspect and advantages of the invention, the plasma display panel can achieve chatter-less stable display even if the input signals near the preset level are input continuously.

In the above-mentioned configuration, it is preferable that the period of continuous display in which the value of the brightness weighting and the value of γ are enhanced has a limitation on its length.

According to this aspect and advantage of the invention, the plasma display panel can restrain the power consumption within the permissible power consumption in the event the input signals over the preset input signal level are inputted continuously for a while.

DESCRIPTION OF THE PREFERRED EMBODIMENTS

First Embodiment

The first embodiment of the present invention will be described with reference to FIG. 1 to FIG. 6 and FIG. 25.

Figure 25:
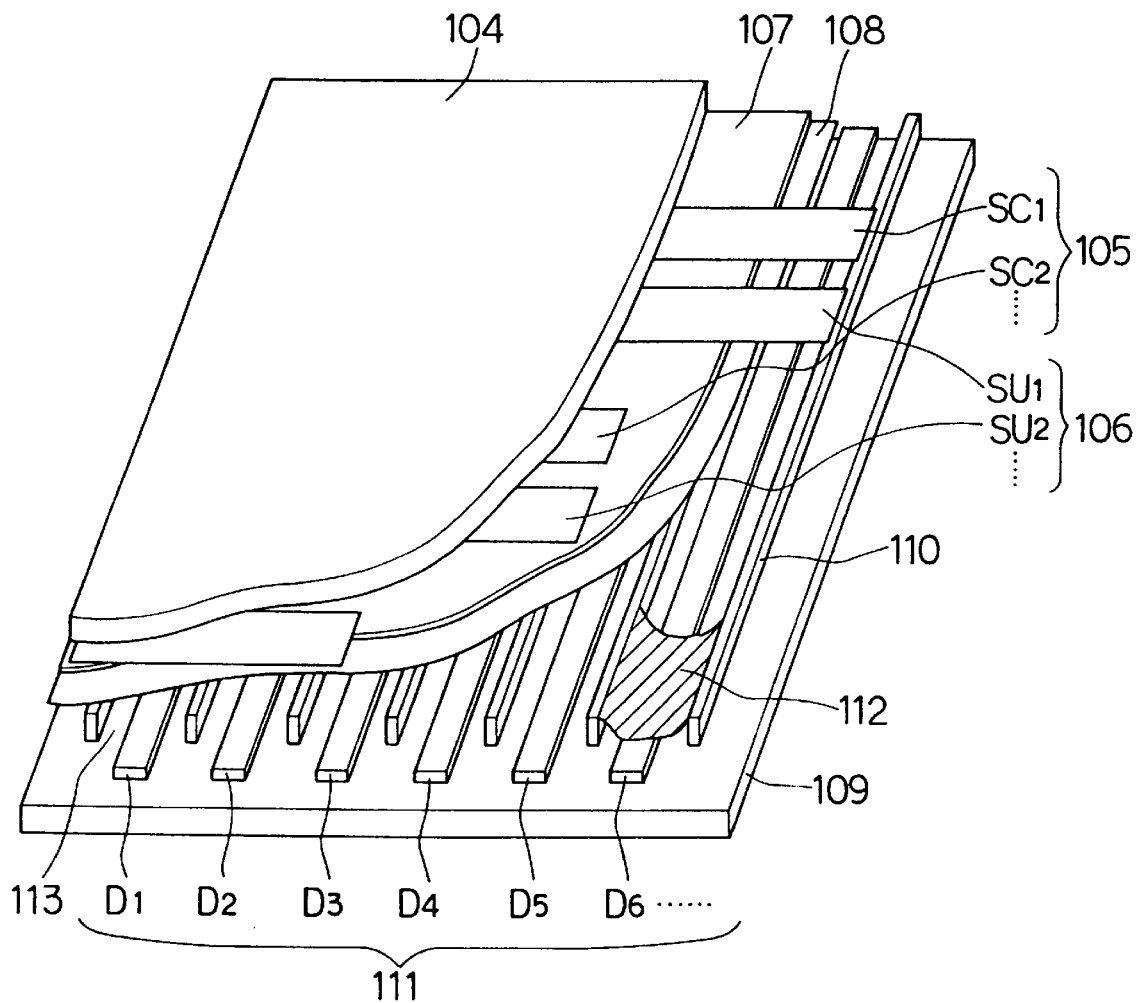
FIG. 25 is an example of a configuration of a plasma display panel of a first embodiment of the present invention.

An example of a plasma display panel that can be used in the present invention will be explained referring to FIG. 25, which shows a sectional plan view of the panel. As shown in FIG. 25, a pair of electrodes including of a scanning electrode 105 and a maintaining electrode 106 that are parallel to each other are formed on a first glass substrate 104. The scanning electrode 105 and the maintaining electrode 106 are covered with a dielectric layer 107 and a protective film layer 108. On a second glass substrate 109, which is facing the first glass substrate 104, a plurality of ribs 110 are arranged orthogonally to the scanning electrode 105 and the maintaining electrode 106. A data electrode 111 is arranged parallel to and between two ribs 110. On the surface of the second glass substrate 109 and the data electrode 111 positioned between the ribs 110, a phosphor layer 112 is provided. A discharge cell 113, is defined by a pair of electrodes including a scanning electrode 105 and a maintaining electrode 106 and two ribs 110. The scanning electrode 105, the maintaining electrode 106 and the data electrode 111 may be composed of Ag or a laminated conductor in which a Cu layer is sandwiched by Cr layers. The dielectric layer 107 may be composed of borosilicate glass and the like, and the protective film layer 108 may be composed of MgO and the like. In the discharge cell 13, at least one discharge noble gas such and helium, neon, argon, xenon and the like is sealed.

An example of an operation of the discharge luminescence display will be explained in brief. In a writing period, a positive write pulse voltage is applied to selected data electrodes 111 and a negative scanning pulse voltage is applied to a scanning electrode $SC_1$. This operation will be applied to scanning electrodes $SC_2, \ldots, SC_N$. Consequently, a write discharge is generated in selected discharge cells 113, and therefore a positive electrical charge is stored on a surface of a protective film layer 108 correspond to luminescence display data. In a maintaining period, a negative pulse voltage is applied to a maintaining electrode 106, and consequently a maintaining discharge is excited by the positive electrical charge generated on the surface of the protective film layer 108. After that, the maintaining discharge is continued by applying a negative pulse voltage to the scanning electrode 105 and the maintaining electrode 106 alternately. The maintaining discharge is ceased by applying a negative erasing pulse voltage to the maintaining electrode 106 in an erasing period. Ultra violet rays emitted by the maintaining discharge excite a phosphor layer 112, then a visible light emitted from the phosphor layer 112 passes externally through the first glass substrate 104.

Figure 1:
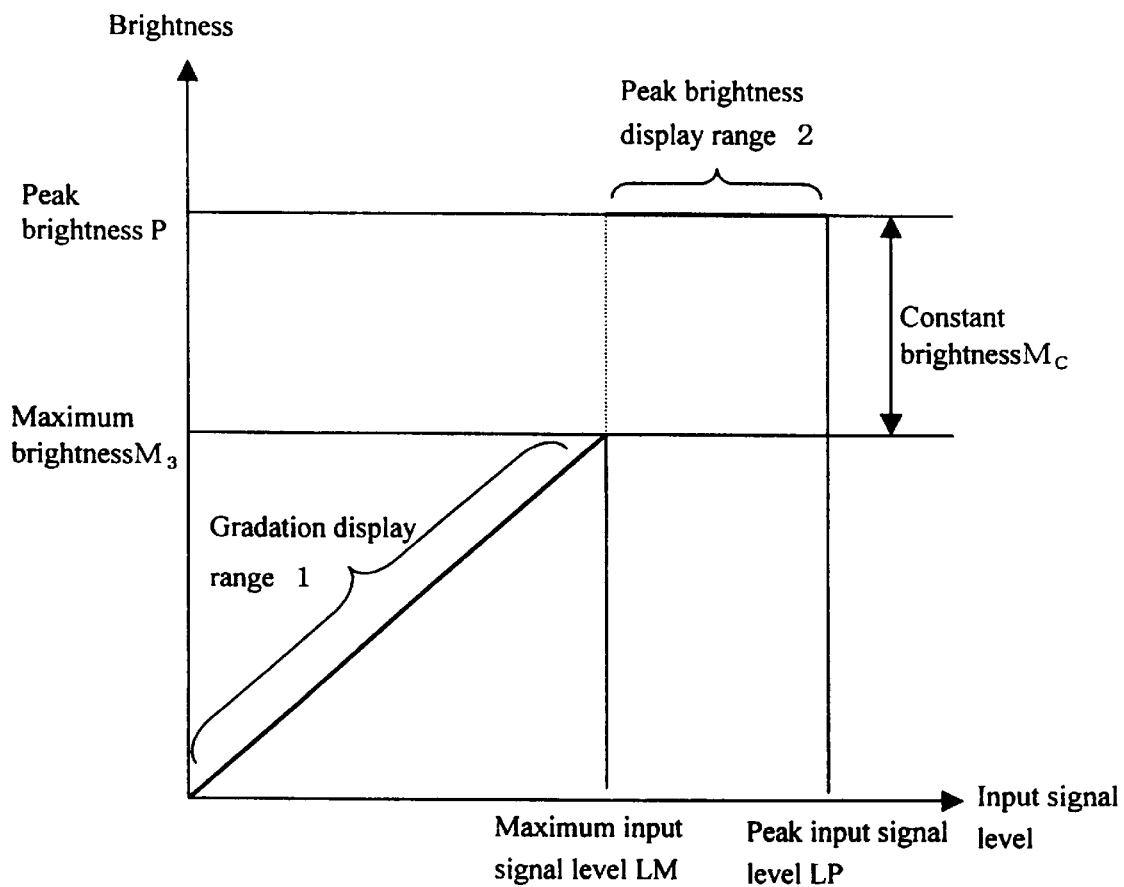
FIG. 1 is a working characteristic diagram of a first embodiment of the present invention.

FIG. 1 is a working characteristic diagram showing the plasma display panel and the method for controlling the brightness of the plasma display panel. The horizontal axis represents the input signal level of the plasma display panel and the vertical axis represents the brightness on the plasma display panel.

As shown in FIG. 1, the brightness increases linearly from 0 to the maximum brightness level $M_3$ corresponding to the input signals from 0 to the maximum input signal level LM. The range for gradation display is range 1. Regarding the input signal higher than the maximum input signal level LM, the brightness becomes the peak brightness P, obtained by adding a constant brightness value $M_C$ which is independent of the gradation display range 1 to the maximum brightness value $M_3$. The range for the constant peak brightness is the peak brightness display range 2.

According to the present invention, when the range of the input signals is up to the maximum input signal level LM, the brightness on the display is a gradation display up to the maximum brightness $M_3$, and when the input signal level is beyond the maximum input signal level LM, the brightness on the display is the constant peak brightness display. Therefore, a high quality plasma display panel can display both high mean value of the brightness and the peak level brightness higher than the maximum brightness $M_3$ without exceeding the maximum permissible power consumption.

Figure 2:
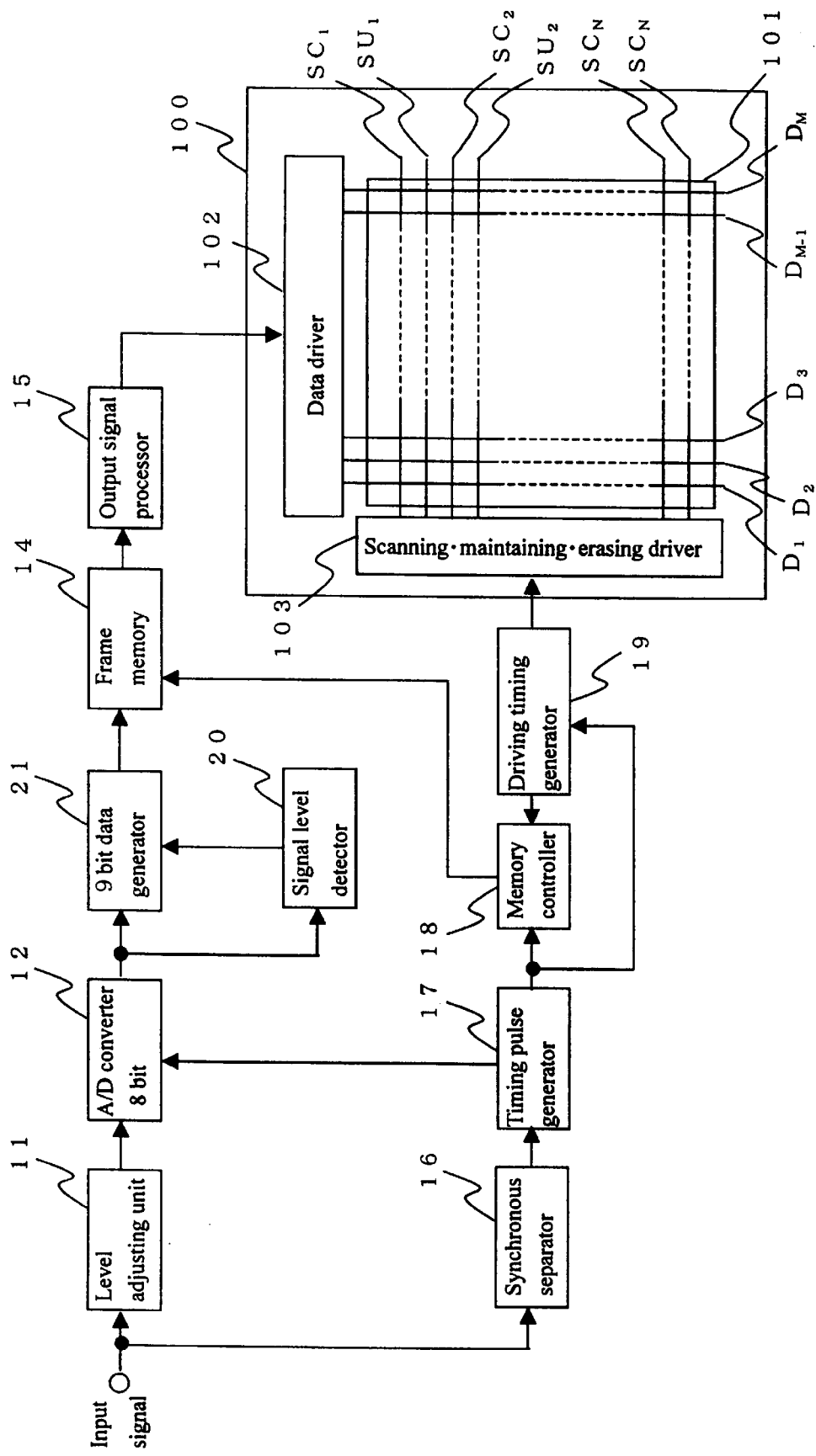
FIG. 2 is a block diagram representation of a driving circuit of a plasma display panel of a first embodiment of the present invention.

Next, FIG. 2 shows the block diagram of the driving circuit. The plasma display panel unit 100 comprises the plasma display panel 101 where M column data electrodes $D_1, \ldots, D_M$ and N line pairs of scanning electrodes $SC_1, \ldots, SC_N$ and maintaining electrodes $SU_1, \ldots, SU_N$ are formed in a matrix, the data driver 102 which drives the M column data electrodes and the scanning.maintaining.erasing driver 103 which drives the N line pairs of the scanning electrodes and maintaining electrodes. The plasma display panel unit 100 is an AC type plasma display panel. In FIG. 2, the processing for the reverse γ correction is omitted from the drawing, but the reverse γ correction is conducted on the data as usual before these are inputted to the frame memory 14.

Next, the signal flow for driving the plasma display panel unit 100 is explained below. The level of the input signal is adjusted by the level adjusting unit 11 and inputted to the 8-bit A/D converter 12. The output signal of the A/D converter 12 is monitored by the signal level detector 20. When the signal level detector 20 detects the TV input signals over the preset maximum input signal level LM up to the peak level LP, the 9-bit data generator 21 generates an additional 1 bit to the detected 8-bit data and converts the detected 8-bit data to 9-bit data for displaying the constant high brightness.

The output data from the 9-bit data generator 21 stored in the frame 14 is outputted via the output processing unit 15 to drive the data driver 102. On the other hand, the timing pulse generator 17 is driven by the input signal via the synchronous separator 16 simultaneously. This output signal of the timing pulse generator 17 drives both the A/D converter 12 and the memory controller 18 as well as the driving timing generator 19. The output signal of the driving timing generator 19 drives the scanning.maintaining.erasing driver 103 and feeds back to the memory controller 18. The memory controller 18 works synchronously with the both output of the timing pulse generator 17 and the driving timing generator 19 and controls the reading and writing of the frame memory 14 for driving the data driver 102 via the output processing unit 15.

Figure 3:
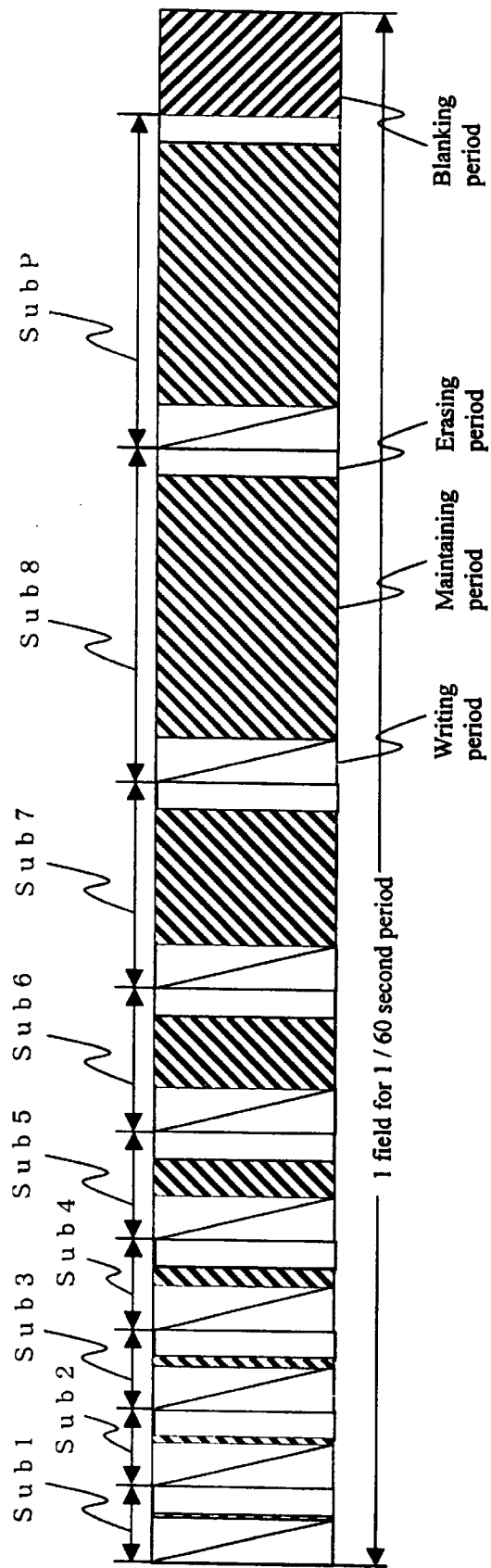
FIG. 3 shows a configuration of a field of a first embodiment of the present invention.
Figure 4:
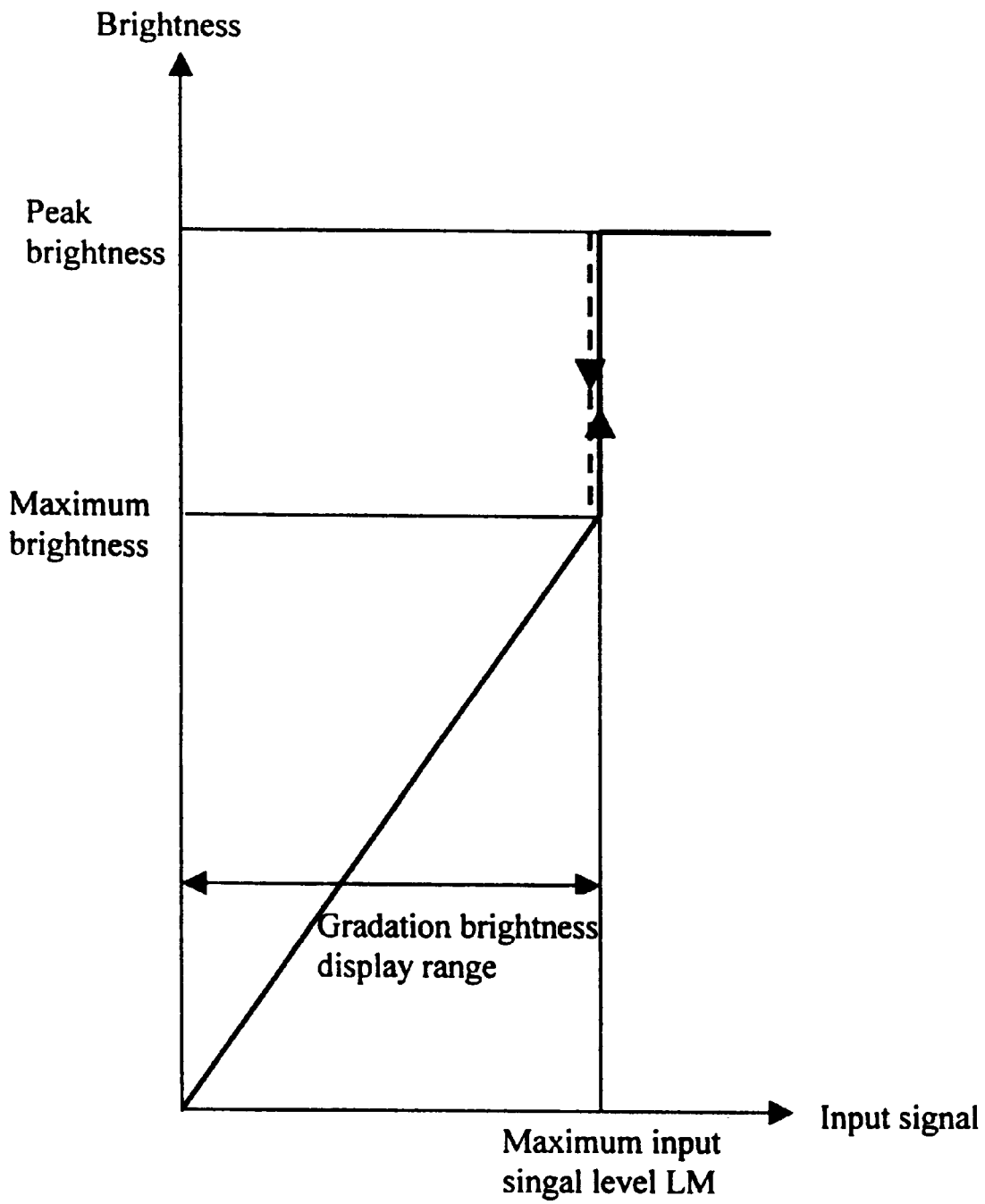
FIG. 4 is a working characteristic diagram representation of a relationship between input signals and brightness on the display of a first embodiment of the present invention.

In the driving circuit shown in FIG. 2, the method for controlling brightness for the gradation display and the peak level brightness display is achieved by the sub-fields for weighting the brightness and the additional sub-field for the constant high brightness in a ⅟60 second period for a field as shown in FIG. 3. In the example of the configuration of one field data shown in FIG. 3, there are 9 sub-fields SUB1, SUB2, ..., SUBP, each of which includes the writing period for data writing discharge, the maintaining period for luminescence display discharge and the erasing period for terminating the maintained discharge. The length of the maintaining period of the each sub-field is different according to the weighting brightness of each sub-field and the length of the maintaining period of the sub-field SUBP corresponds to the constant brightness which will be added to the maximum brightness. For example, the brightness obtained by each sub-field SUB1, SUB2, ..., SUB8 weighted as $2^0*B_0$, $2^1*B_0, \ldots, 2^7*B_0$ ($B_0$:unit brightness), $2^8=256$ level gradation can be obtained by the combination of the weighted brightness. In this example, the maximum brightness will be $(2^0+2^1+\ldots+2^7)*B_0=255*B_0$ and the brightness obtained by SUBP can be represented as $P*B_0$. Therefore, the plasma display panel can display the brightness up to $(255+P)*B_0$ as the peak brightness.

Figure 6:
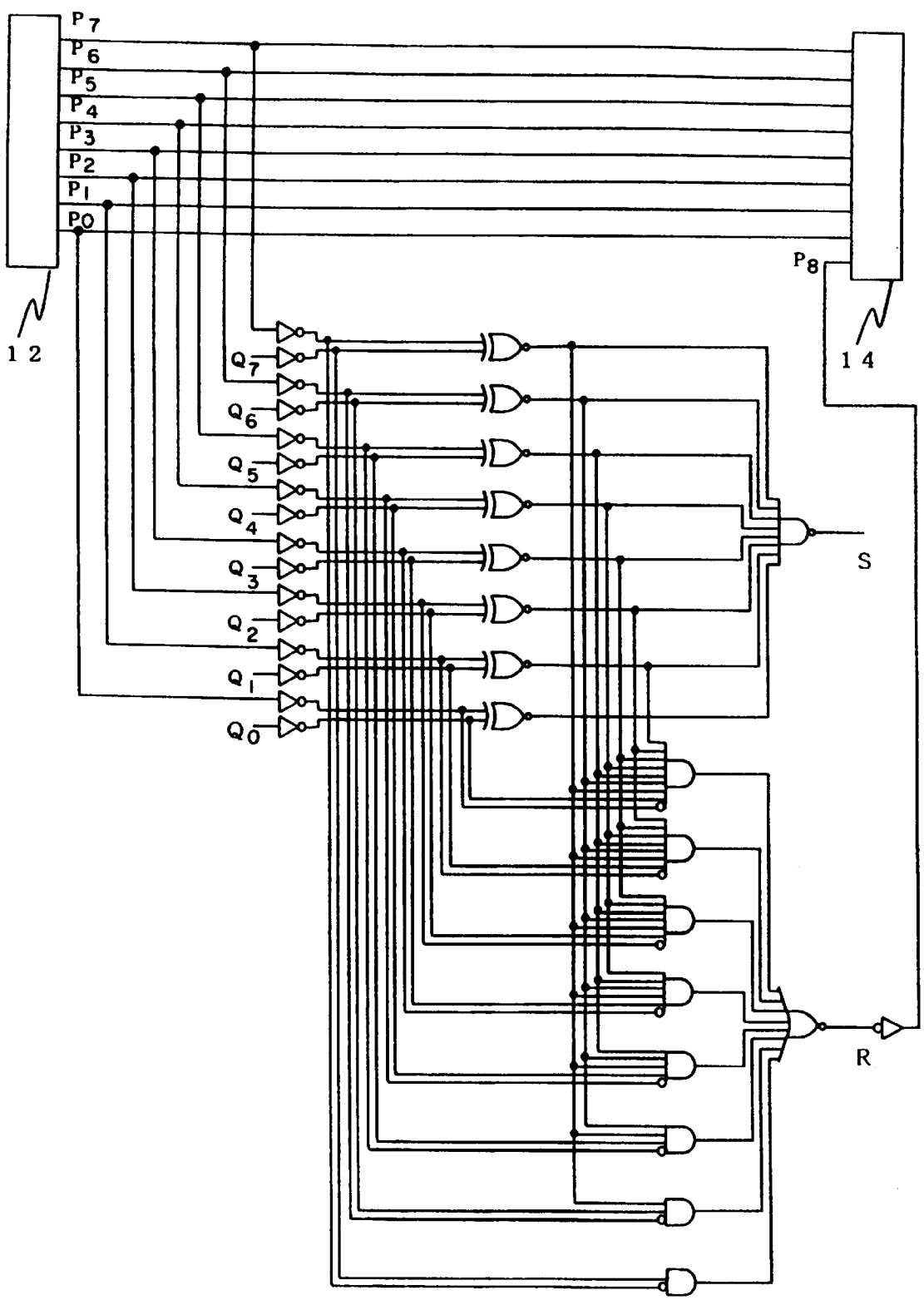
FIG. 6 is a circuit diagram representation of a 9-bit data generator of a first embodiment of the present invention.

An example of the configuration of the 9-bit data generator 21 is shown by FIG. 6, and the logic table of the 9-bit data generator 21 is shown below.

| INPUT | R OUTPUT | S OUTPUT |
|-------|----------|----------|
| P = Q | H | L |
| P > Q | L | H |
| P < Q | H | H |

The circuit shown in FIG. 6 includes the signal level detector 20 and the 9-bit data generator 21. The circuit shown in FIG. 6 compares the 8-bit data P ($P_0,P_1,P_2,P_3,P_4,P_5,P_6,P_7$) and the 8-bit data Q ($Q_0,Q_1,Q_2,Q_3,Q_4,Q_5,Q_6,Q_7$) converted from the maximum input signal level LM (the detecting signal level LD) shown in FIG. 20. If P>Q, the data level of the $P_8$ bit turns to H level, the $P_8$ bit is added to the 8-bit data P for 9-bit data conversion and the converted 9-bit data are stored in the frame memory 14 after the reverse γ correction. The data $P_0$ to $P_7$ in the 9-bit data correspond to the sub-field SUB1 to SUB8 and the data $P_8$ correspond to the sub-field SUBP.

Next, the operating of the driving circuit shown in FIG. 2 is described below. The level of the TV input signals to the A/D converter 12 is adjusted by the level adjusting unit 11 to the peak input signal level LP shown in FIG. 20, and the input signals whose level is up to the peak input signal level LP are inputted to the 8-bit A/D converter 12 and converted. The converted output data of the A/D converter 12 are inputted to the signal level detector 20, and detected to determine whether there are signals over the maximum input signal level LM or not. When the signals over the maximum input signal level LM are detected, the output signals of the A/D converter 12 are converted to 9-bit data by adding one additional bit $P*B_0$ data to the 8-bit data $2^0*B_0 \sim 2^7*B_0$ by the 9-bit data generator 21.

Figure 5:
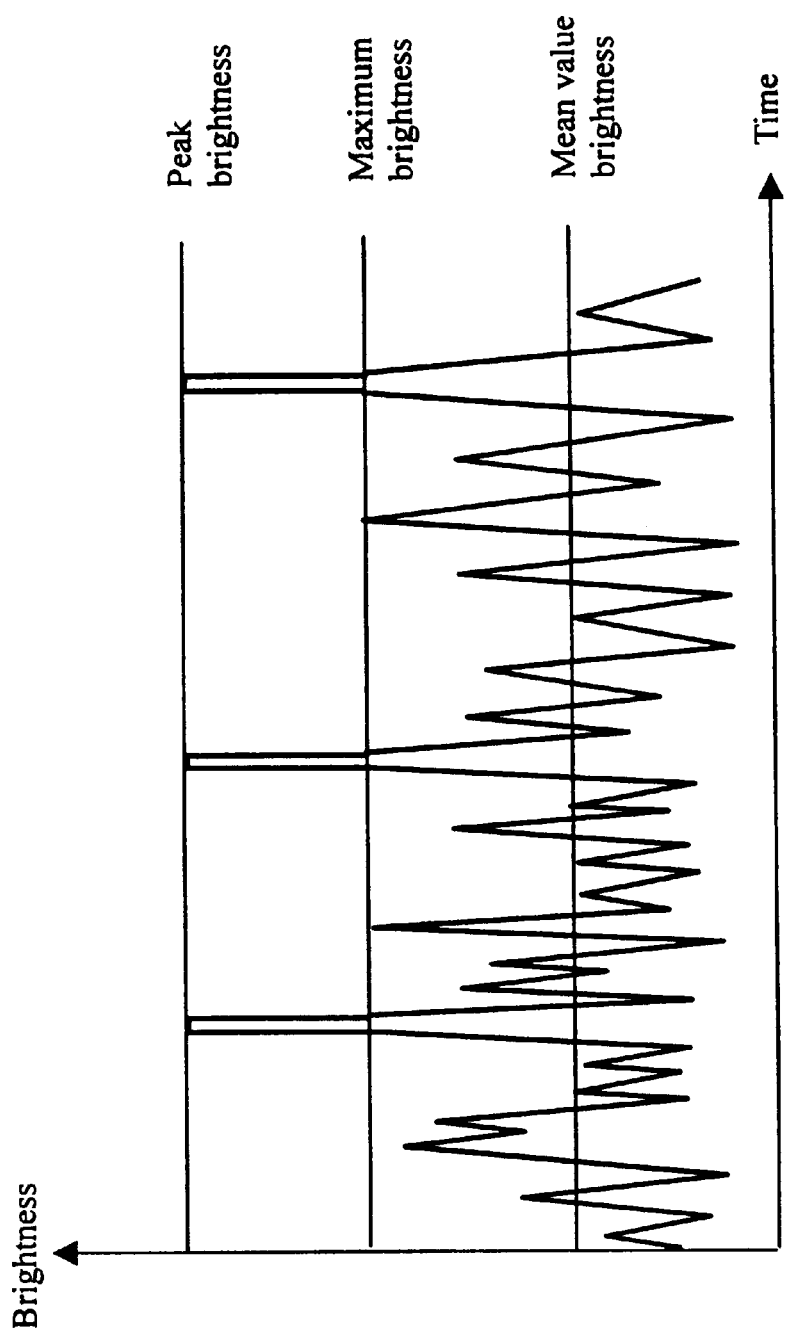
FIG. 5 is a working characteristic diagram representation of brightness (waveform) on the display corresponding to the input signals of the first embodiment of the present invention.
Figure 20:
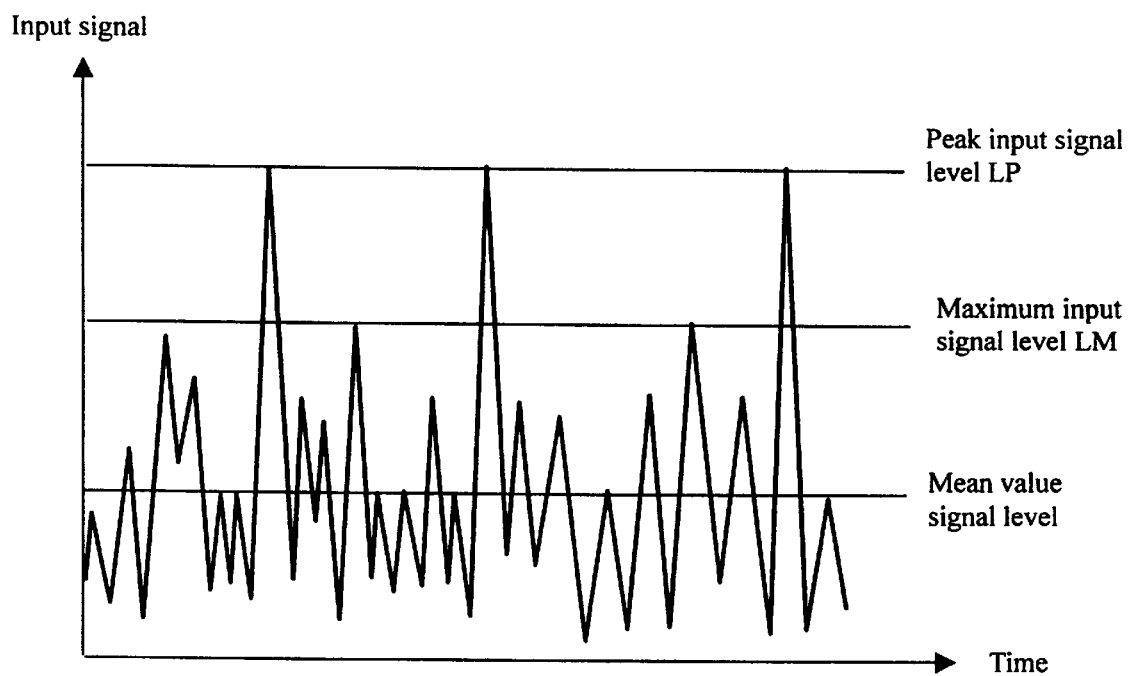
FIG. 20 shows a general TV broadcasting input signal.
Figure 21:
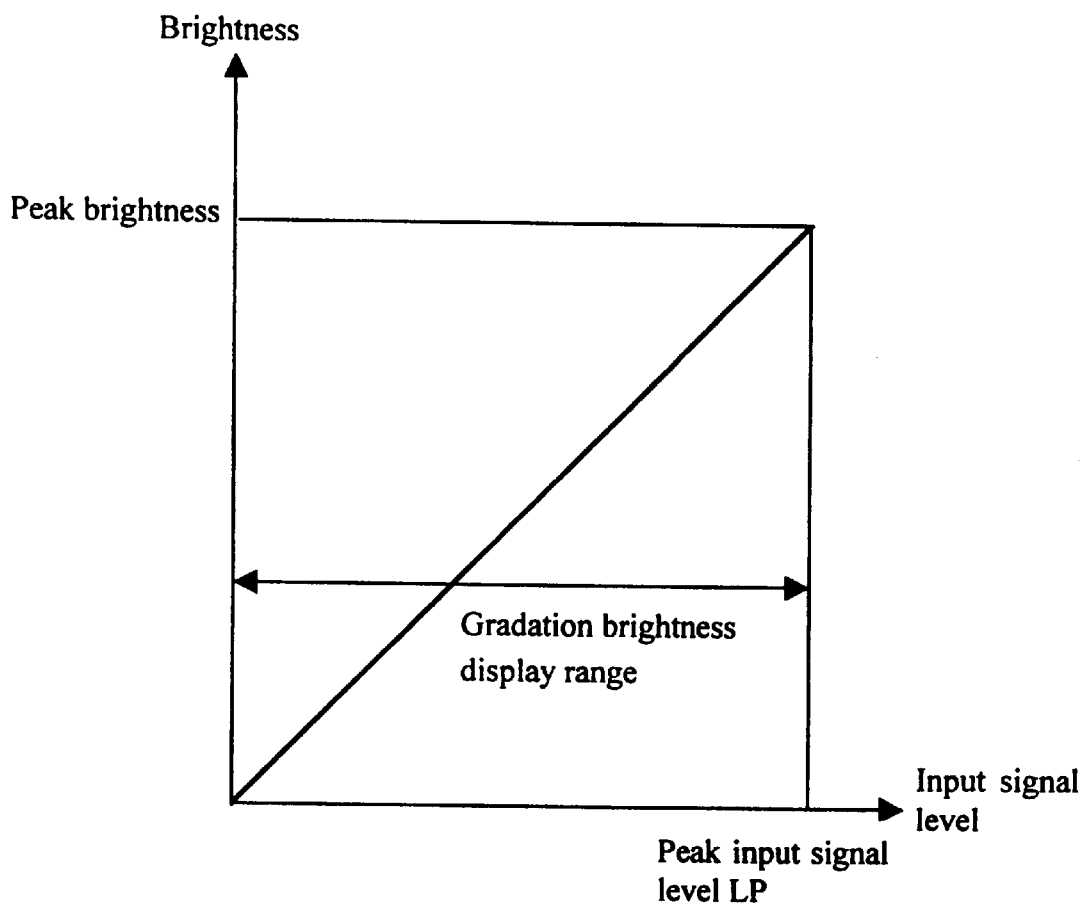
FIG. 21 is a working characteristic diagram representation of a relationship between input signals and brightness on the display of a conventional plasma display panel.
Figure 22:
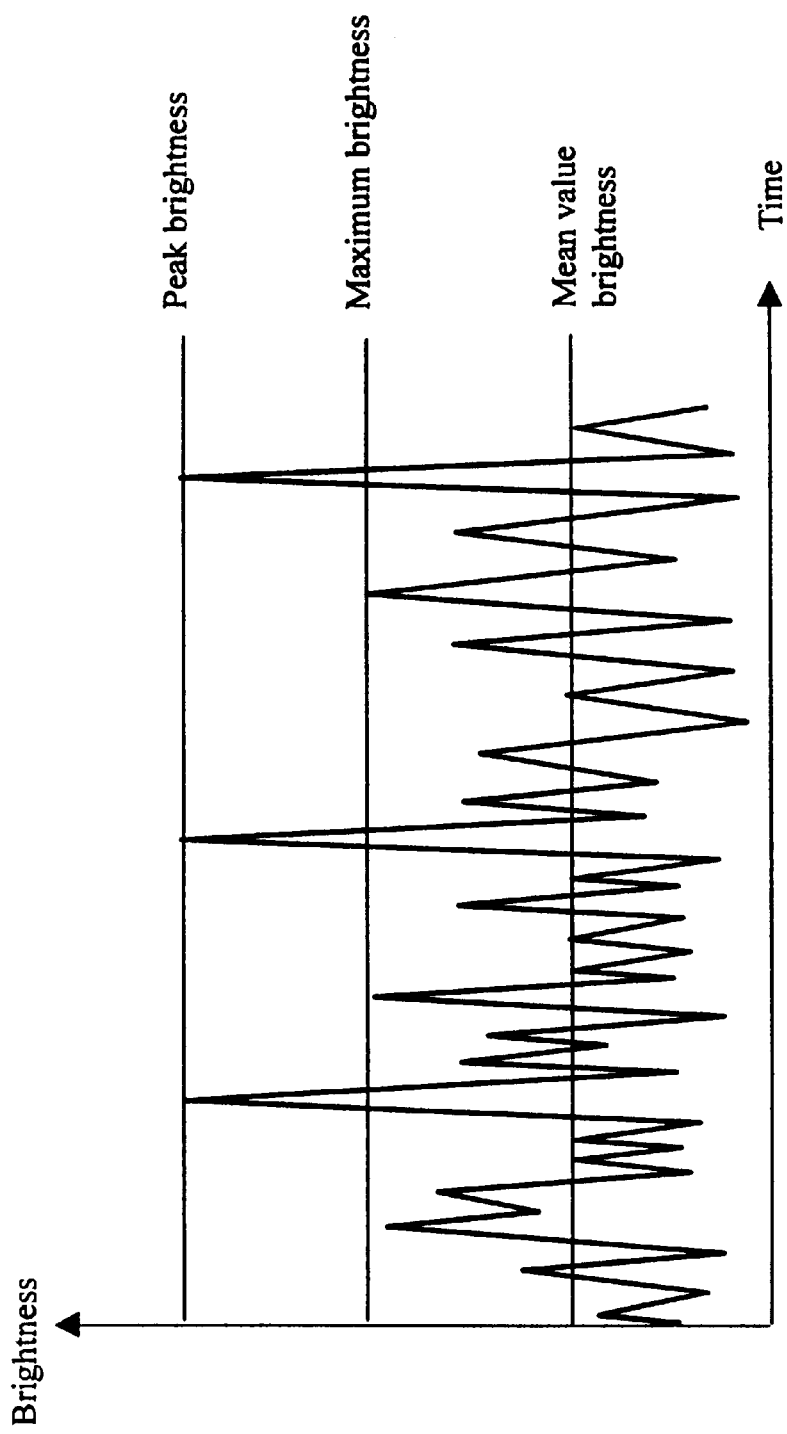
FIG. 22 is a working characteristic diagram representation of brightness (waveform) on the display corresponding to the input signal of a conventional plasma display panel.
Figure 23:
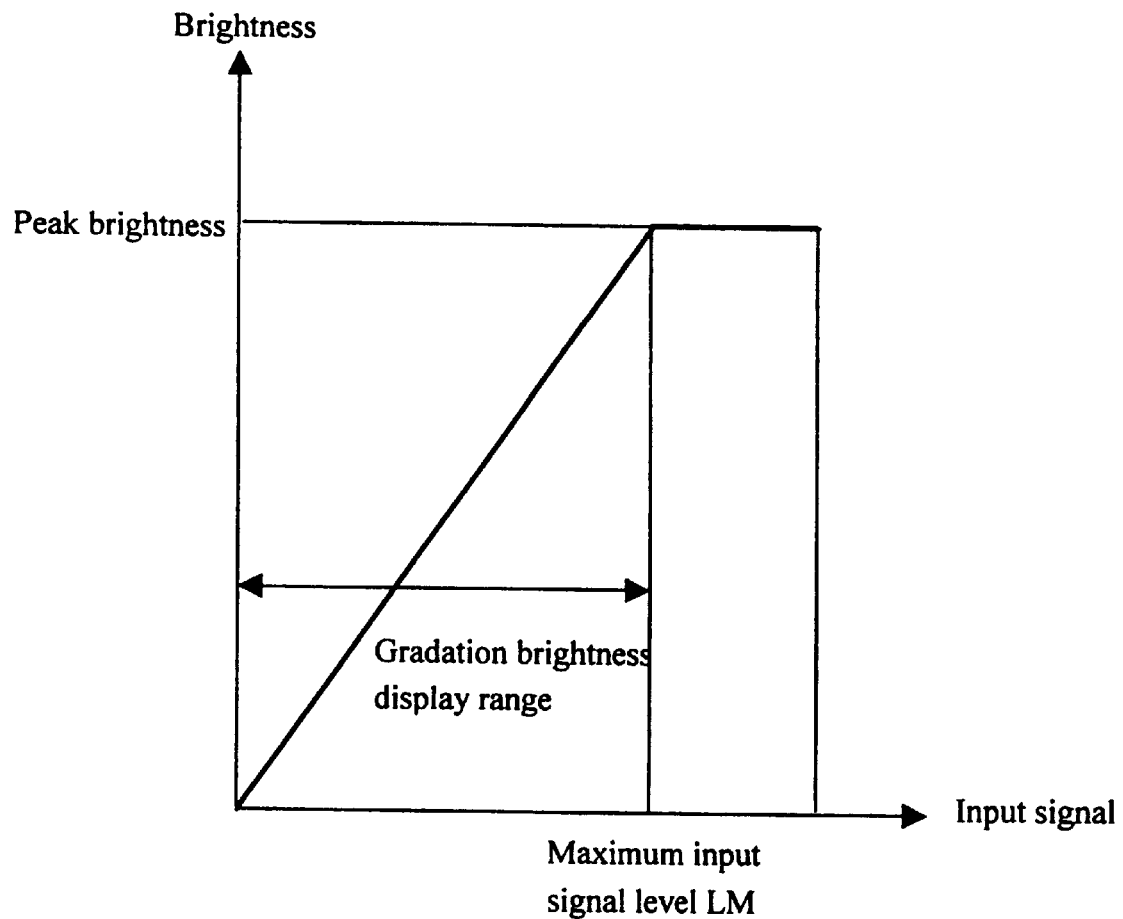
FIG. 23 is another working characteristic diagram representation of a relationship between input signals and brightness on the display of a conventional plasma display panel.
Figure 24:
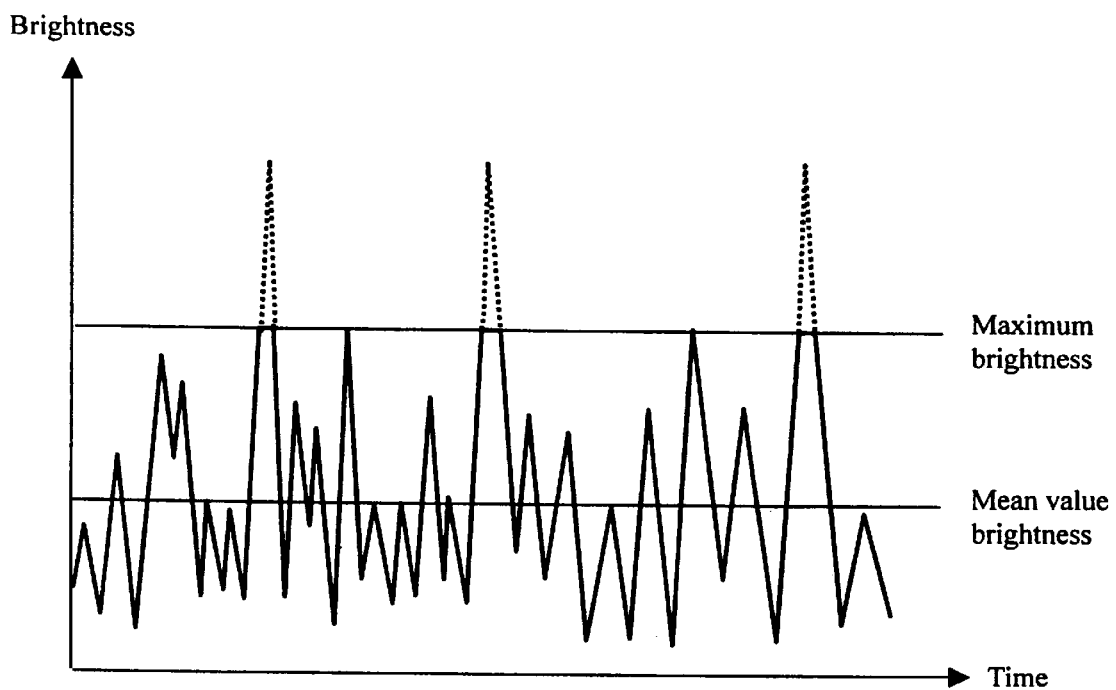
FIG. 24 is another working characteristic diagram representation of brightness (waveform) on the display corresponding to the input signal of a conventional plasma display panel.

By the above-mentioned processing, the input signals up to the maximum input signal level LM are converted to gradation brightness display up to the maximum brightness and the input signals over the maximum input signal level LM are converted to the constant peak brightness display. That is, all input signals shown in FIG. 20 are converted to the brightness display on the plasma display, the variation of the brightness display up to the maximum brightness corresponds precisely to the variation of the input signal up to the maximum input signal level LM and the brightness display for the input signal over the maximum input signal LM is the constant brightness saturating at the peak brightness as shown in FIG. 5.

By the above-mentioned processing, the plasma display panel can restrain the temperature increase within a permissible range, and achieve high mean value of the brightness display and peak brightness that is higher than the maximum brightness.

For example, as described in the prior art, if the three conditions are as follows, the limit brightness for maintaining the permissible temperature of the plasma display panel in continuous displaying is 420 cd/m², the mean value of the brightness corresponding to the TV input signals is 200 cd/m² and the incidence of the peak input signals is 10%, the maximum brightness corresponding to the maximum input signal will be 420 cd/m² at most by the conventional method for brightness control. However, according to the method of the present invention, the peak brightness corresponding to the peak level input signal will be 600 cd/m² by setting the maximum brightness M3 as 400 cd/m² because of the following calculation;

$$420\ cd/m^2 - 400\ cd/m^2 = 20\ cd/m^2$$

$$20\ cd/m^2 \div 10\% = 200\ cd/m^2$$

$$400\ cd/m^2 + 200\ cd/m^2 = 600\ cd/m^2$$

Therefore, the peak brightness can be set to a high brightness 200 cd/m² higher than the maximum brightness and the high quality plasma display panel can be provided.

Actually, the maximum brightness 400 cd/m² and the peak brightness 600 cd/m² are achieved on the 640*480 pixels 42-inch color plasma display panel in the supporting experiment.

When the incidence of the peak level input signal is more than 10% or the period of continuous inputting of the peak level input signal becomes long, it is preferable that the time limit for continuous displaying of peak brightness is set so as to maintain the temperature of the plasma display panel within the permissible temperature range. As an example for this operation, a function for the time limit is added to the processing of the input signal level detector 20 shown in FIG. 2, so the input signal level detector 20 will suspend its function in case of continuous input of the peak level signal input over the preset period and the input signal level detector 20 will resume its function after a certain period passes.

In the above, the level of the input signal for switching from the gradation display to the peak brightness display is selected as the maximum input signal level LM, it does not need to limit as LM.

Second Embodiment

The second embodiment of the present invention will be described with reference to FIG. 7 to FIG. 9.

Figure 7:
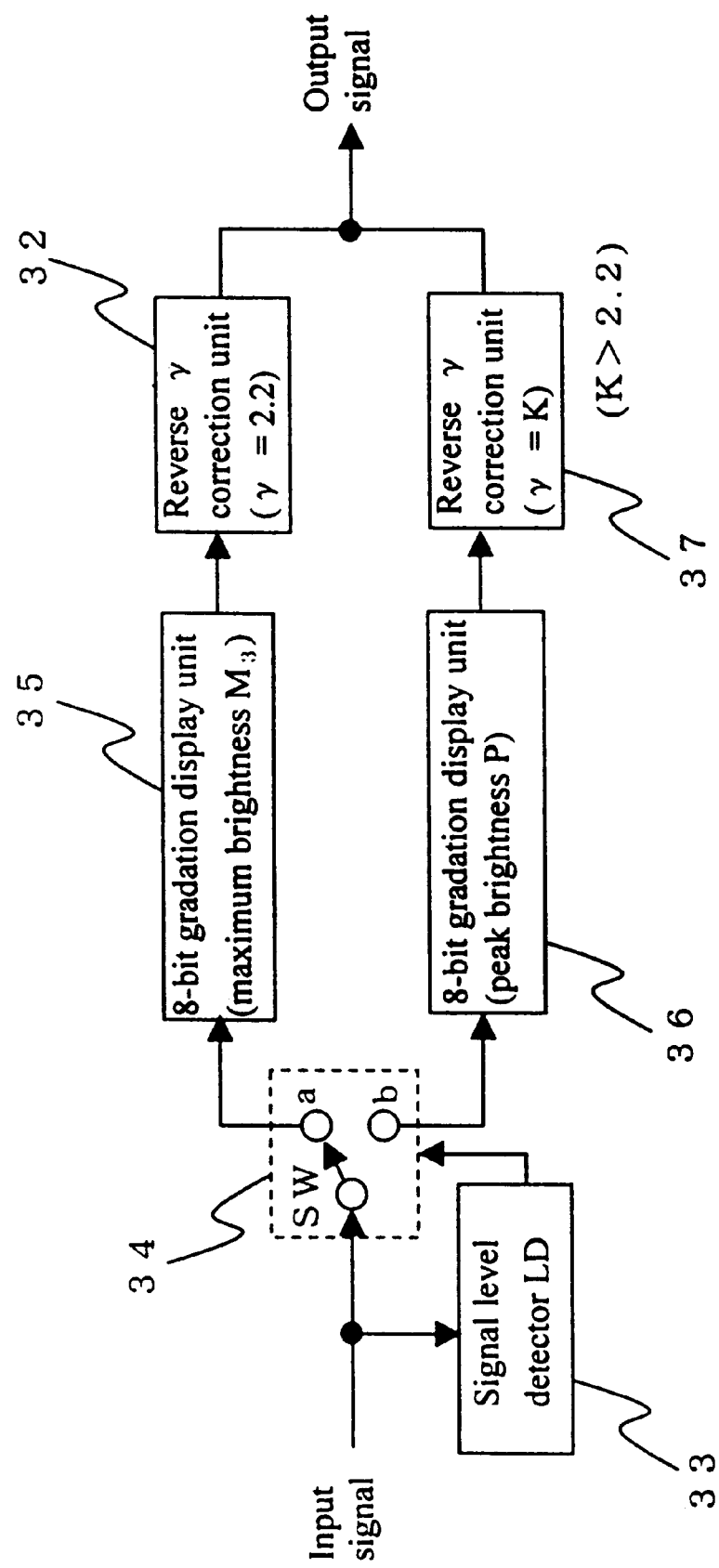
FIG. 7 is a basic configuration diagram representation of a brightness controlling method of a second embodiment of the present invention.

FIG. 7 is a basic configuration diagram representation of a brightness controlling method for a plasma display panel of a second embodiment of the present invention.

Referring to FIG. 7, when the signal level detector 33 detects the input signal level and the detected level is under the preset detecting signal level LD, the signal level detector 33 turns the switch (SW) 34 to side a. In this case, the input signals are converted to the linear 256 gradation data signals by the 8-bit gradation display processing unit 35, then converted to the output signals for correct brightness display up to the maximum brightness M3 by the reverse γ correction 32.

If the detected level is over the preset detecting signal level LD, the signal level detector 33 turns the switch (SW) 34 to side b. In this case, the input signals are converted to the linear 256 gradation data signals corresponding up to the peak brightness P by the 8-bit gradation display processing unit 36, then converted to the output signals for correct brightness display up to the peak brightness P by γ=K correction by the reverse γ correction 37.

The processing details of the above-mentioned operation are described below. FIG. 8 shows the working characteristic diagram representation of the relationship between the input signals and the brightness on the display. In FIG. 8, the horizontal axis represents the input signal level of the plasma display panel and the vertical axis represents the brightness display on the plasma display, and the linear chain line ⑤, the linear chain line ⑦, the curved solid line ⑥ and the curved dotted line ⑧ represent the relationship horizontal axis, the preset signal level is shown as the detection signal level LD. The method for gradation display on the plasma display panel in this case is the same method utilizing sub-fields described by FIG. 16(a) and FIG. 16(b), and the same descriptions relating to the sub-fields are omitted in this description.

Figure 8:
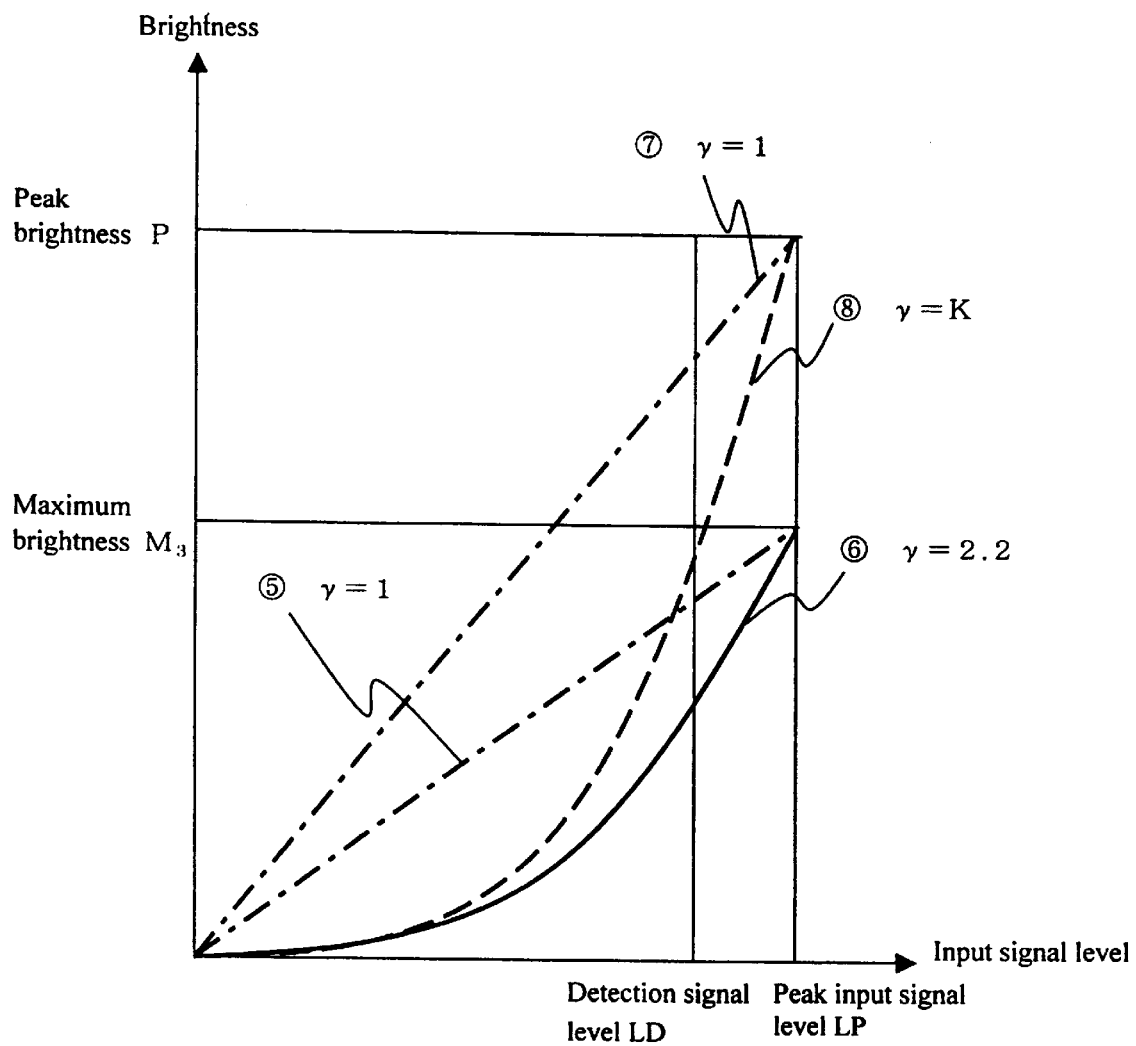
FIG. 8 is a working characteristic diagram representation of the relationship between input signals and brightness on the display of the second embodiment of the present invention.

Next, referring to FIG. 7 and FIG. 8, when the input signal level is under the preset detection signal level LD, the signal level detector 33 detects the input signals under the detection level LD and then turns the switch (SW) 34 to side a. The relationship between the input signals and the brightness display will be the linear chain line ⑤ by the 8-bit gradation display processing unit 35, then corrected to the solid curved line ⑥ to have γ=2.2 reverse γ characteristic by the reverse correction unit 32 as shown in FIG. 8. Consequently, a precise brightness display up to the maximum brightness M3 can be obtained. The maximum brightness M3 is set slightly lower to take into consideration the maximum permissible power of the plasma display panel. The length of the maintaining period in the sub-fields shown as FIG. 16(a) is adjusted and set properly in order to obtain the maximum brightness M3.

When the input signal level is over the preset detection signal level LD, the signal level detector 33 detects the input signals over the detection level LD and then turns switch (SW) 34 to side b. The relationship between the input signals and the brightness display will be the linear chain line ⑦ which has γ=1γ characteristic by the 8-bit gradation display processing unit 36, then corrected to the dotted curved line ⑧ to have γ=K(K>2.2) reverse γ characteristic by the reverse γ correction unit 37 as shown in FIG. 8. Consequently, a precise brightness display up to the peak brightness P can be obtained. The peak brightness P is set to the maximum permissible power or slightly higher in order to obtain higher brightness display. The length of the maintaining period in the sub-fields shown as FIG. 16(b) is adjusted and set properly A times in order to obtain the peak brightness P.

Figure 16:
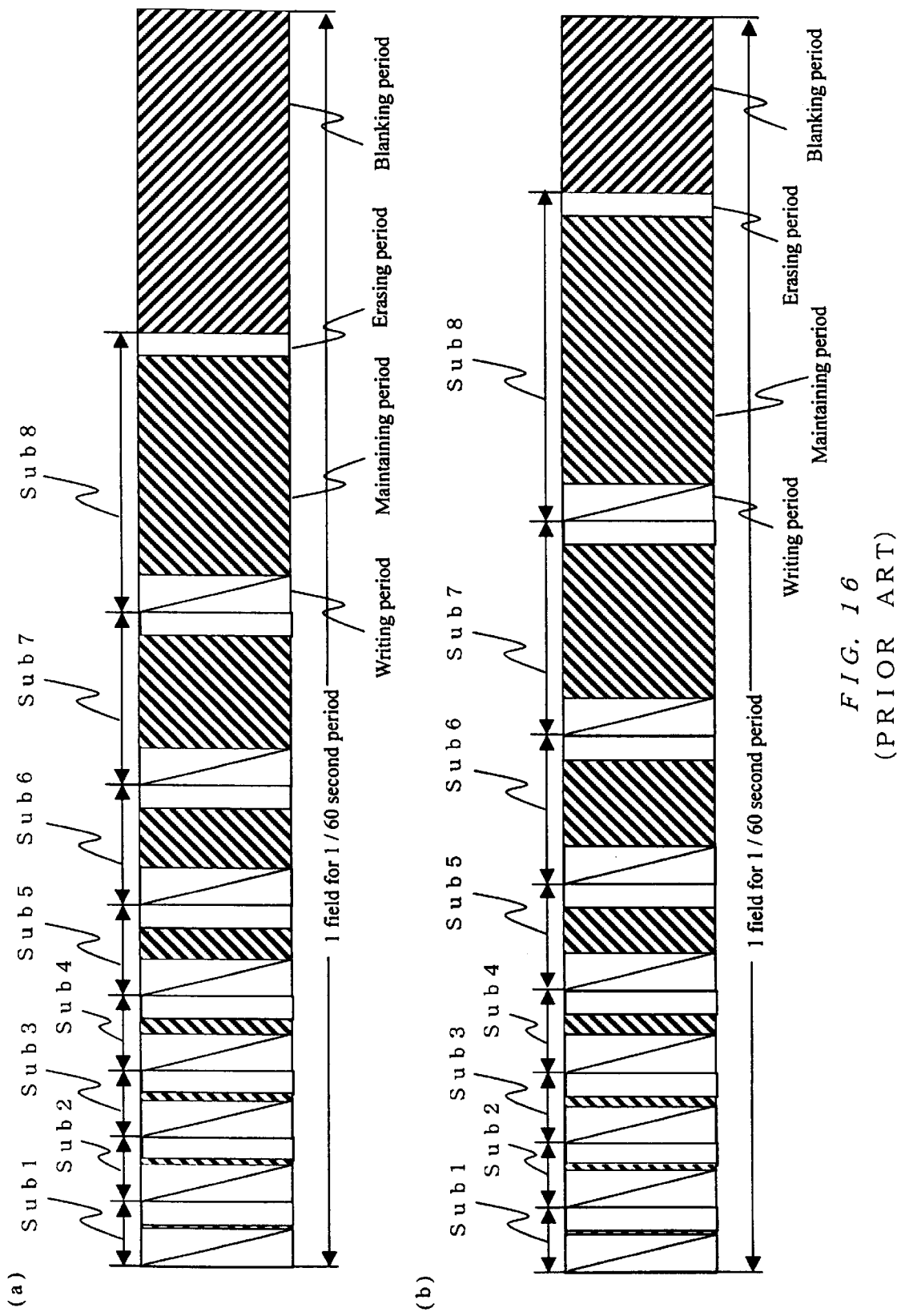
FIG. 16 shows a configuration of a field of a conventional plasma display panel.
Figure 17:
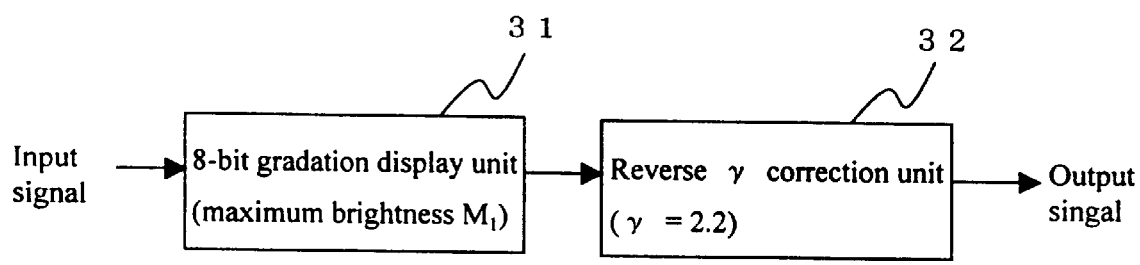
FIG. 17 is a basic configuration diagram representation of a conventional brightness controlling method of a conventional plasma display panel.
Figure 18:
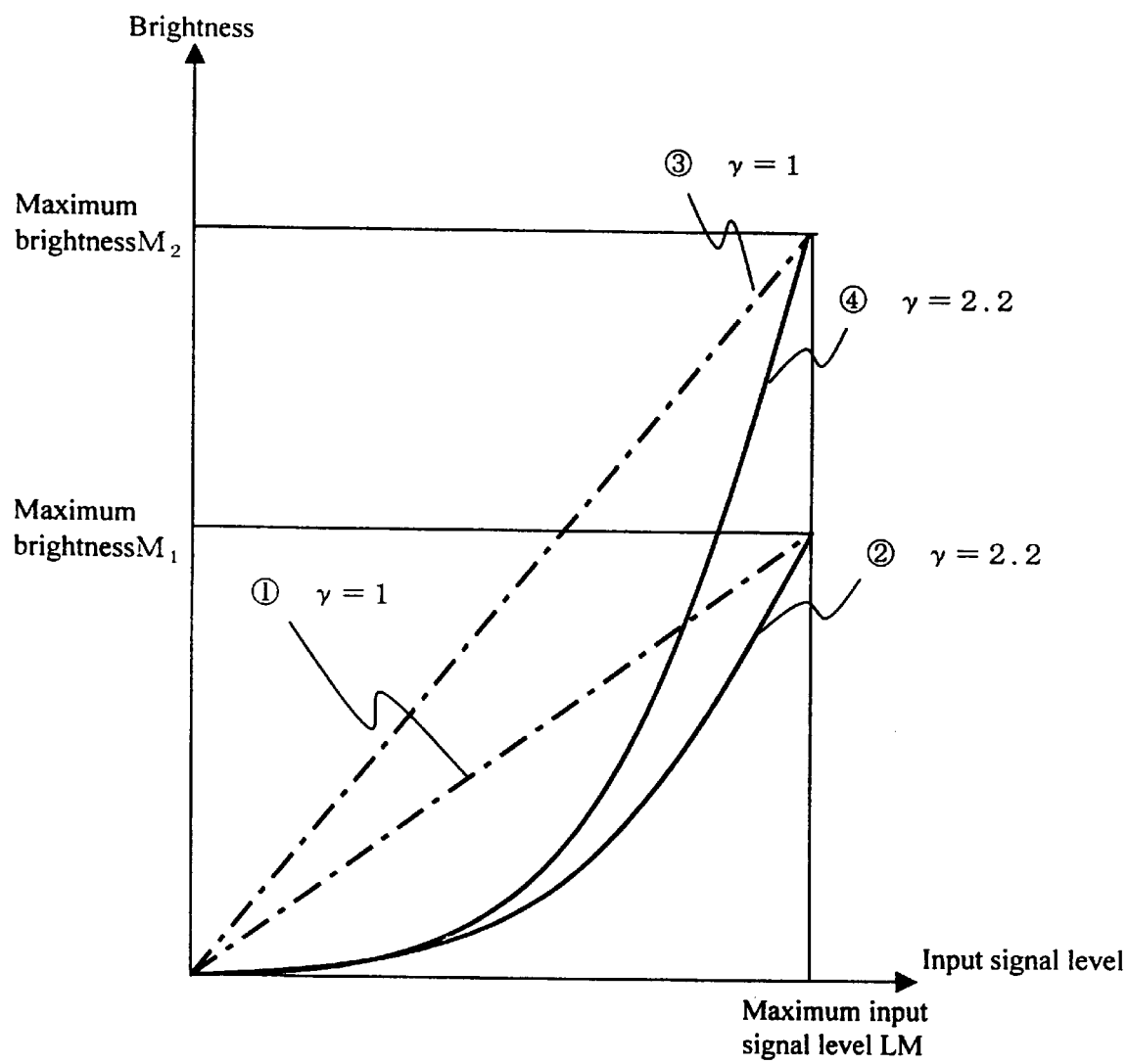
FIG. 18 is a working characteristic diagram representation of a relationship between input signals and brightness on the display of a conventional plasma display panel.
Figure 19:
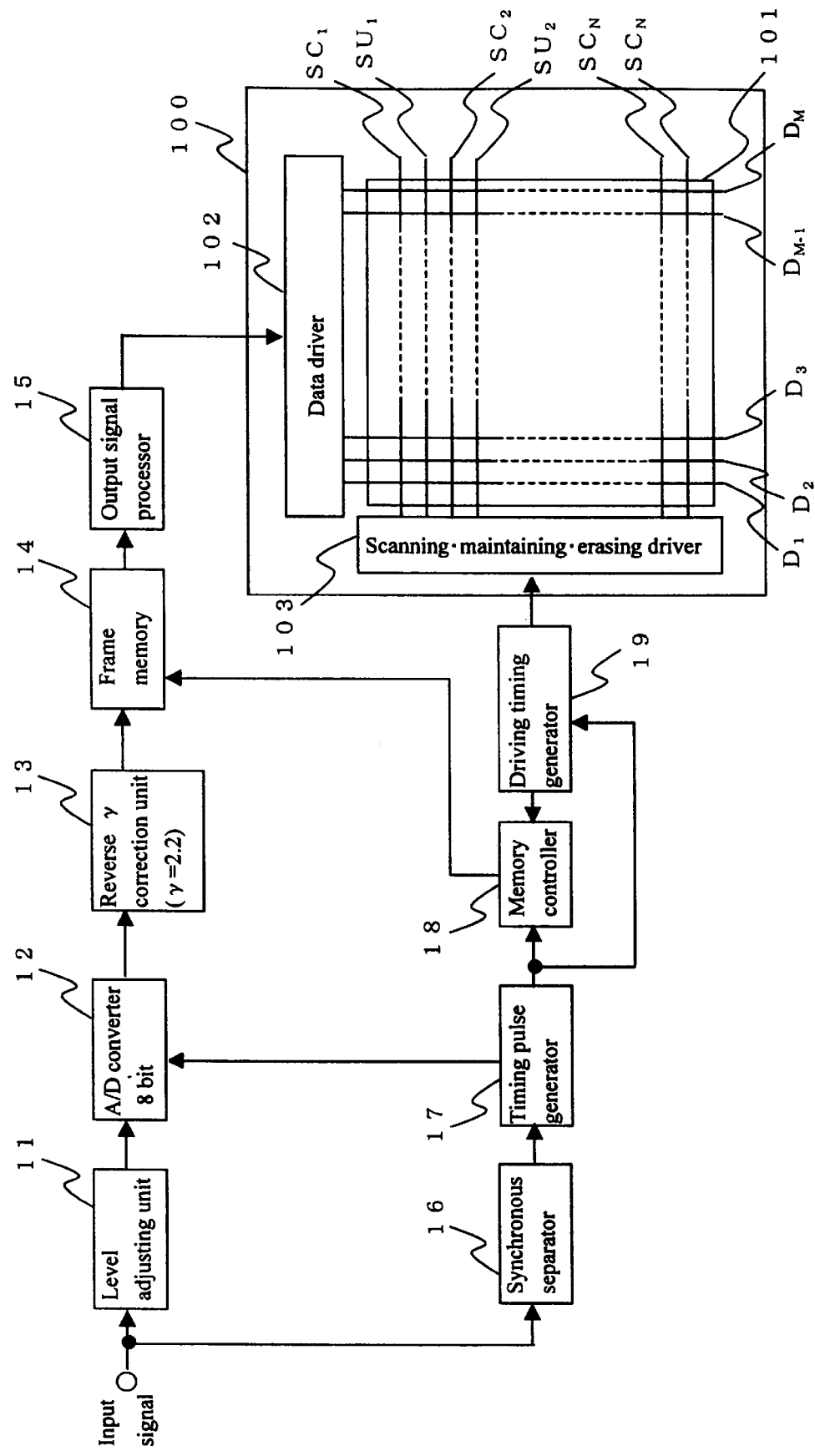
FIG. 19 is a block diagram representation of a driving circuit of a conventional plasma display panel.

As described above, the plasma display panel of this second embodiment turns its sub-fields from the sub-fields shown in FIG. 16(a) whose brightness weighting corresponds to a lower brightness gradation display, to the sub-fields shown in FIG. 16(b), whose brightness weighting corresponds to a higher brightness gradation display and also turns the γ correction value from γ=2.2 to γ=K(K>2.2) when the input signal level becomes larger than the preset detection signal level LD. When the input signal level becomes smaller than the preset detection signal level LD, the plasma display panel of this second embodiment turns its sub-fields from the sub-fields shown in FIG. 16(b) to the sub-fields shown in FIG. 16(a) again and also turns the γ correction value from γ=K(K>2.2) to γ=2.2 again. The value of K is set so that the curved solid line ⑥ and the curved dotted line ⑧ become close at the input range under the half value of the peak input signal level LP and are spaced more distantly at the input range over the half value of the peak input signal level LP. By this setting, the brightness display corresponding to the input signal under the detection signal level LD changes little even though sub-fields are turned from the curved solid line ⑥ to the curved dotted line ⑧. On the contrary, the brightness display corresponding to the input signals over the detection signal level LD increases clearly to the peak brightness. Consequently, the brightness display corresponding to the input signals over the detection signal level LD is emphasized selectively, and the high brightness display and the high contrast display will be achieved without exceeding the maximum permissible power.

Figure 9:
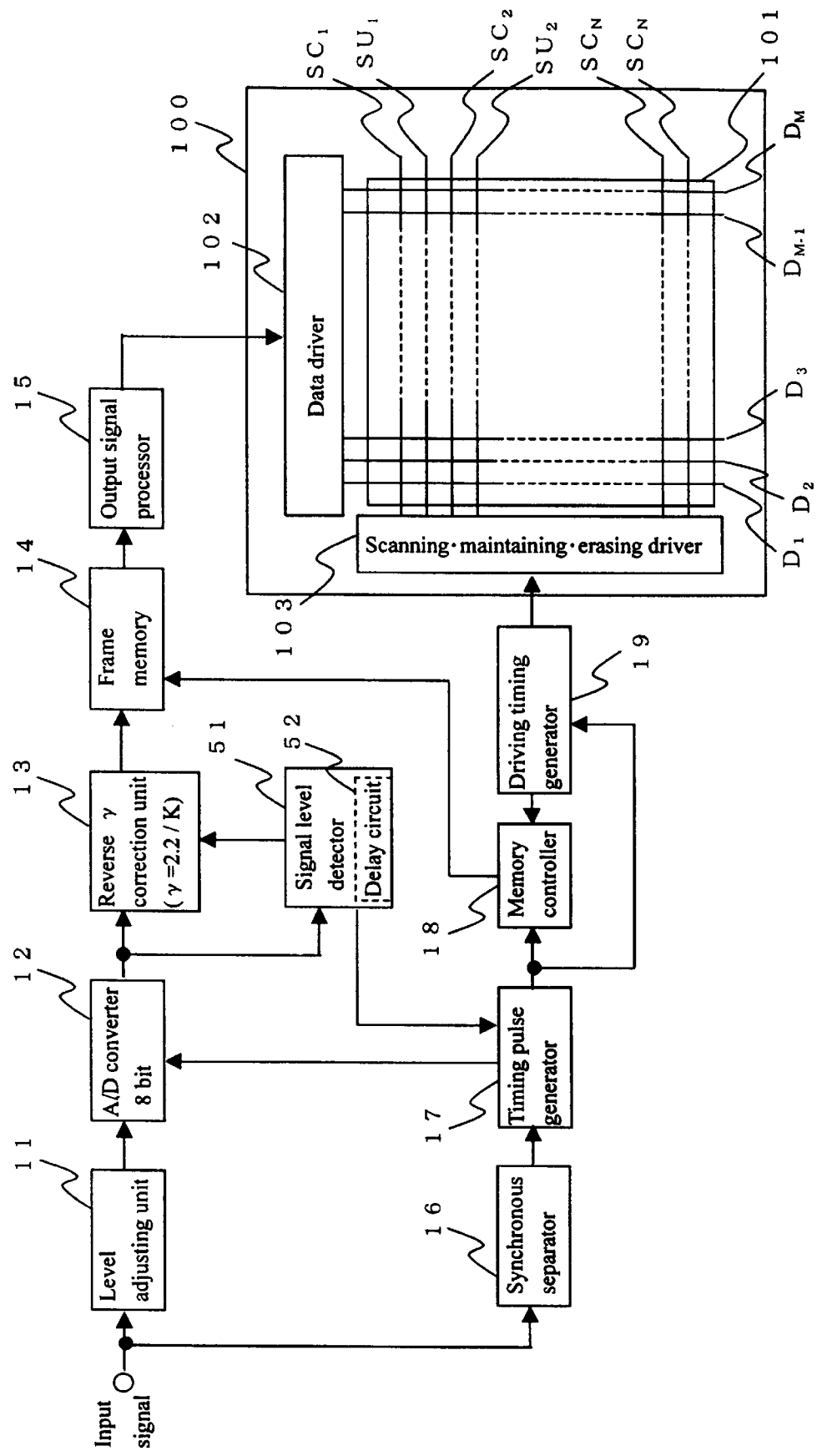
FIG. 9 is a block diagram representation of a driving circuit of a plasma display panel of a second embodiment of the present invention.

The block diagram of the driving circuit and the plasma display panel is shown in FIG. 9. The plasma display panel unit 100 comprises the plasma display panel 101 where M column data electrodes $D_1, \ldots, D_M$ and N line pairs of scanning electrodes $SC_1, \ldots, SC_N$ and maintaining electrodes $SU_1, \ldots, SU_N$ are formed in a matrix, the data driver 102 which drives the M column data electrodes and a scanning.maintaining.erasing driver 103 which drives the N line pairs of the scanning electrodes and maintaining electrodes. The plasma display panel unit 100 is an AC type plasma display panel.

Next, the signal flow for driving the plasma display panel unit 100 is explained below. The level of the input signal is adjusted by the level adjusting unit 11 and inputted to the 8-bit A/D converter 12. The output signal of the A/D converter 12 is inputted to the frame memory 14. After γ correction (γ=2.2 or γ=K) by the γ correction unit 13, processed data are stored in the frame memory 14. The stored data is outputted via the output data processing unit 15 in order to drive the data driver 102. On the other hand, the timing pulse generator 17 is driven by the input signals via the synchronous separator 16 simultaneously. The output signals of the timing pulse generator 17 drive both the A/D converter 12 and the memory controller 18 as well as the driving timing generator 19. These output signals of the driving timing generator 19 set the timing for the writing period, the maintaining period and the erasing period and also set the timing for deciding the length of the maintaining period corresponding to the brightness weighting of the sub-fields. The output signal of the driving timing generator 19 drives the scanning.maintaining.erasing driver 103 and feedback to the memory controller 18. The memory controller 18 works synchronously with the both output of the timing pulse generator 17 and the driving timing generator 19 and controls the reading and the writing of the frame memory 14 for driving the data driver 102 via the output processing unit 15.

The output signal of the A/D converter 12 is monitored by the signal level detector 51. When the signal level detector 51 detects the TV input signals over the preset detection signal level LD, the timing pulse generator 17 changes the setting of the timing for deciding the length of the maintaining corresponding to the brightness weighting of the sub-fields and also changes the value of γ of the reverse γ correction unit 13.

By the control of the driving circuit shown in FIG. 9, the relationship between the input signal and the brightness display on the plasma display panel 100 will be the solid curved line ⑥ which has γ=2.2 reverse γ characteristic when the input signal level is under the detection signal level LD and the maximum brightness $M_3$ will be obtained corresponding to the peak input signal level LP. When the input signal level is over the detection signal level LD, the relationship between the input signal and the brightness display will be the dotted curved line ⑧ which has γ=K (K>2.2) reverse γ characteristic and the peak brightness P which is higher than the maximum brightness $M_3$ will be obtained corresponding to the peak input signal level LP.

Next the method for controlling the brightness of the plasma display is described with reference to the normal TV input signals. FIG. 20 shows a general TV broadcasting input signal. As shown in FIG. 20, there are maximum input signal level LM (detection signal level LD) signals frequently seen in the TV input signals and the peak input signal level LP signals occasionally seen in the TV input signals. Both those maximum input signal level LM and the peak input signal level LP signals are seen irregularly mixed in the mean value level input signals, which are of relatively low level. The incidence of the input signals which range between the maximum input signal level LM (detection input signal level LD) to the peak input signal level LM is some small percentage at most. Therefore, if the detection is around the maximum input as around the maximum input signal level LM, the increase of the power consumption of the plasma display panel will be small and the temperature of the panel will be restrained within the maximum permissible temperature even though the brightness display is enhanced up to the peak brightness P.

For example, as described in the prior art, if the three conditions are as follows, the limit brightness for maintaining the permissible temperature of the plasma display panel in continuous displaying is 420 $cd/m^2$, the mean value of the brightness corresponding to the TV input signals is 200 $cd/m^2$ and the incidence of the peak input signals is 10%, the maximum brightness corresponding to the maximum input signal will be 420 $cd/m^2$ at most by the conventional method for brightness control. However, according to the method of the present invention, the peak brightness corresponding to the peak level input signal will be 600 $cd/m^2$ by setting the maximum brightness M3 as 400 $cd/m^2$ because of the following calculation;

$$420 \text{ cd/m}^2 - 400 \text{ cd/m}^2 = 20 \text{ cd/m}^2$$

$$20 \text{ cd/m}^2 \div 10\% = 200 \text{ cd/m}^2$$

$$400 \text{ cd/m}^2 + 200 \text{ cd/m}^2 = 600 \text{ cd/m}^2$$

Therefore, the peak brightness can be set to a high brightness 200 $cd/m^2$ higher than the maximum brightness and the high quality plasma display panel can be provided.

Actually, the maximum brightness 400 $cd/m^2$ and the peak brightness 600 $cd/m^2$ are achieved on the 640*480 pixels 42-inch color plasma display panel in the supporting experiment.

Third Embodiment

The third embodiment of the present invention will be described with reference to FIG. 9 to FIG. 11. This third embodiment of the present invention provides the high quality plasma display panel and the method for controlling the brightness even when the TV signal inputs that vary near the detection input signal level LD are continued as shown in FIG. 11.

Figure 10:
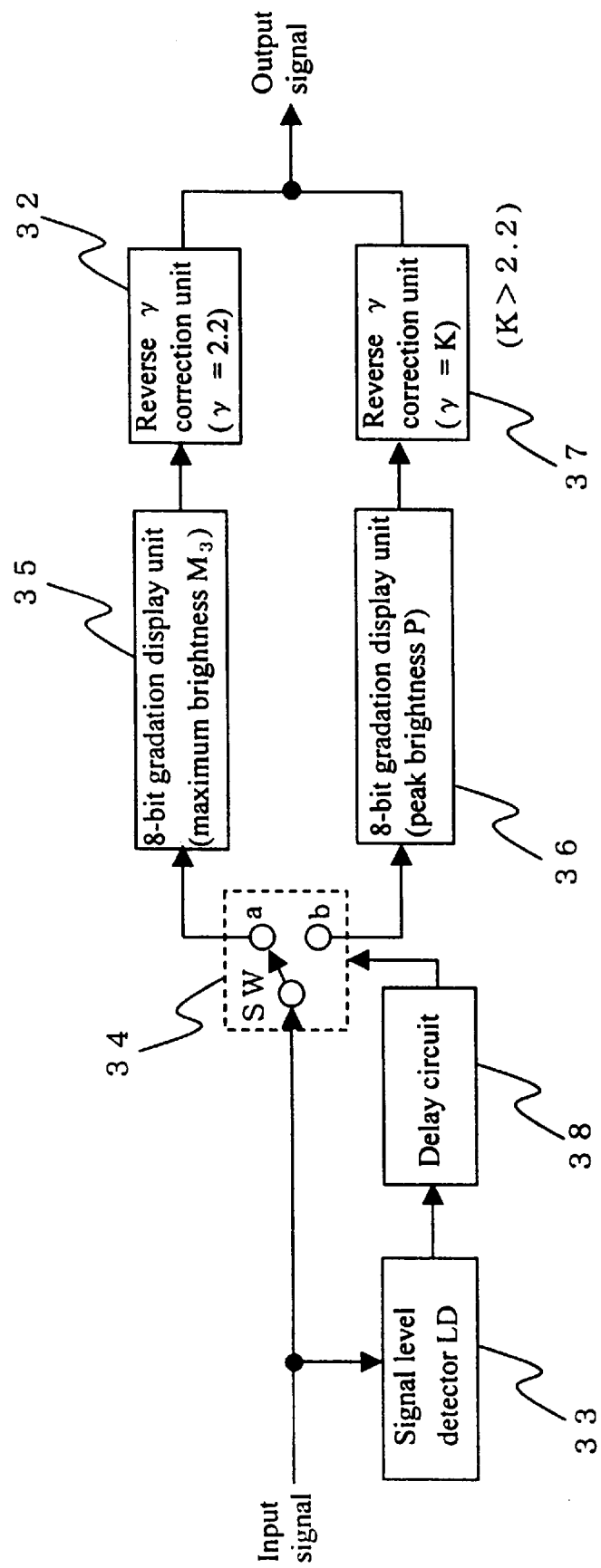
FIG. 10 is a basic configuration diagram representation of a brightness controlling method of a plasma display panel of a third embodiment of the present invention.
Figure 11:
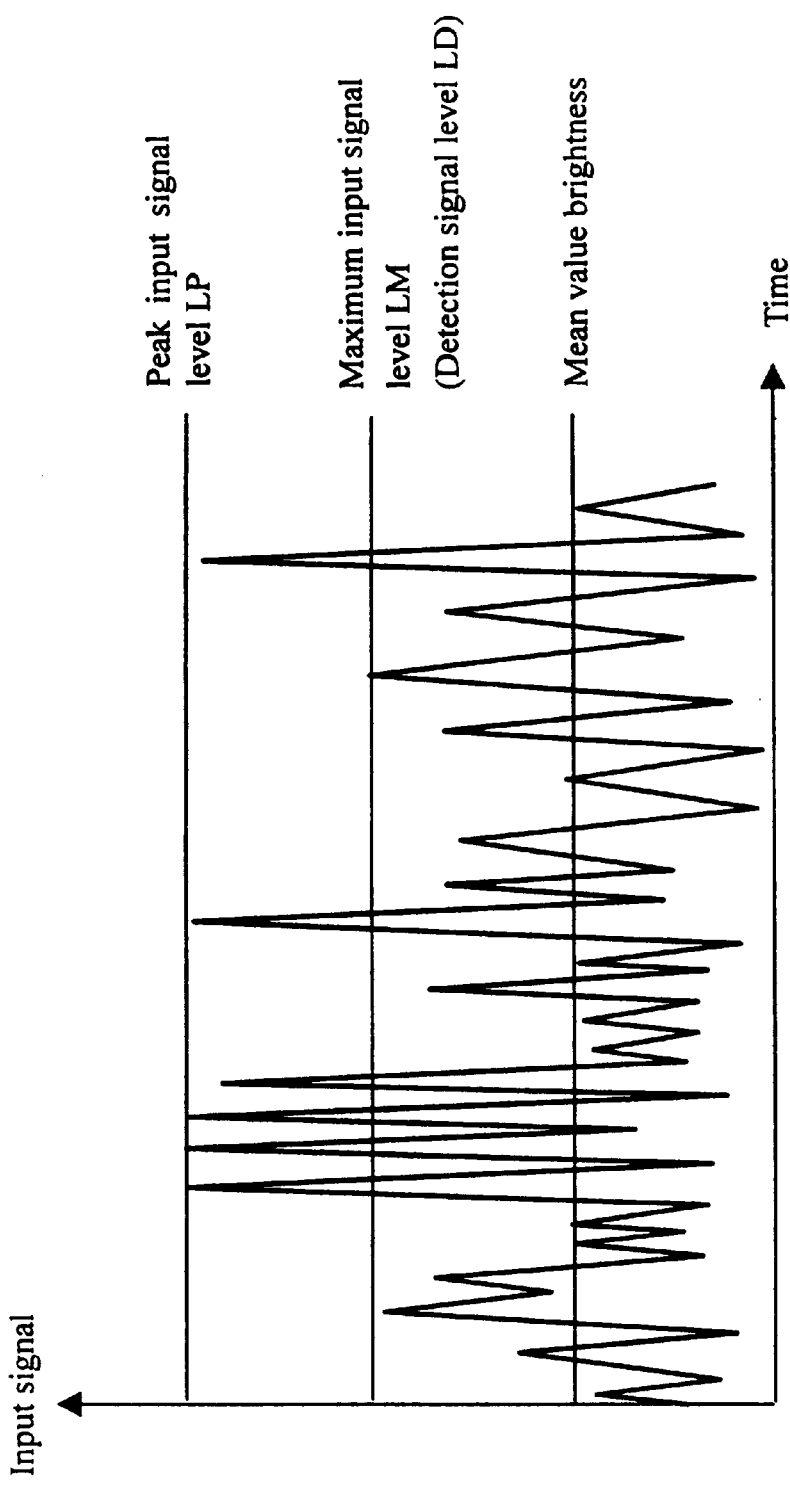
FIG. 11 shows a special case seen in TV broadcasting input signals.

Referring first to FIG. 10, FIG. 10 is a basic configuration diagram representation of a brightness controlling method of a plasma display panel of a third embodiment of the present invention. In this description about the third embodiment, the same descriptions as that of the second embodiment are omitted and the descriptions related to the different part from the second embodiment are described below.

In the second embodiment as shown in FIG. 7, the switch (SW) 34 is directly switched by the output signals of the signal level detector 33. The third embodiment as shown in FIG. 10, the output signals of the signal level detector 33 are delayed for certain preset time by the delay circuit 38, then inputted to the switch (SW) 34 to switch. As shown in FIG. 11, when the TV signal inputs varying near the detection input signal level LD are continued, the plasma display panel shown in FIG. 7 switches the characteristics of the brightness display between the solid curved line ⑥ and the dotted curved line ⑧ shown in FIG. 8 intermittently corresponding to the variation of the input. This phenomenon cause a flicker on the display. In this third embodiment as shown in FIG. 10, the timing of the switching of the characteristics of the brightness weighting and the reverse value of the γ is delayed at least when the input signals go beyond or drop below the detection signal level LD because the outputs of the signal level detector 33 are delayed by the delay circuit 38.

In order to achieve this function, the signal level detector 51 of the driving circuit includes the delay circuit 52 as shown in FIG. 9 in order to delay the timing for switching the switch (SW) 34, which in turn delays the timing of the output signals from the signal level detector 51 to the reverse γ correction unit 13 and the timing pulse generator 17. The plasma display panel will achieve the flicker-less and stable high brightness display.

Fourth Embodiment

Figure 13:
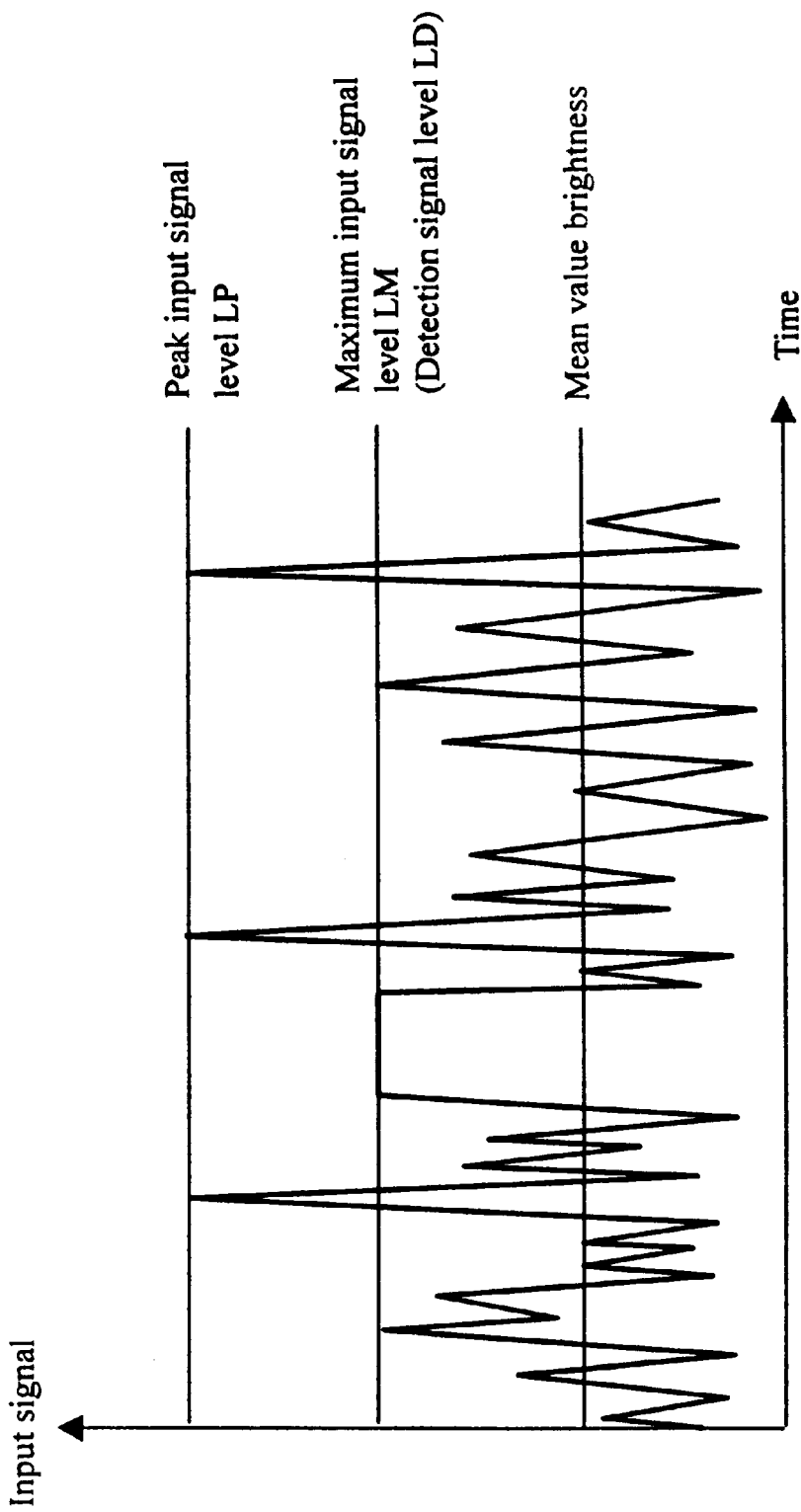
FIG. 13 shows another special case seen in TV broadcasting input signals.
Figure 14:
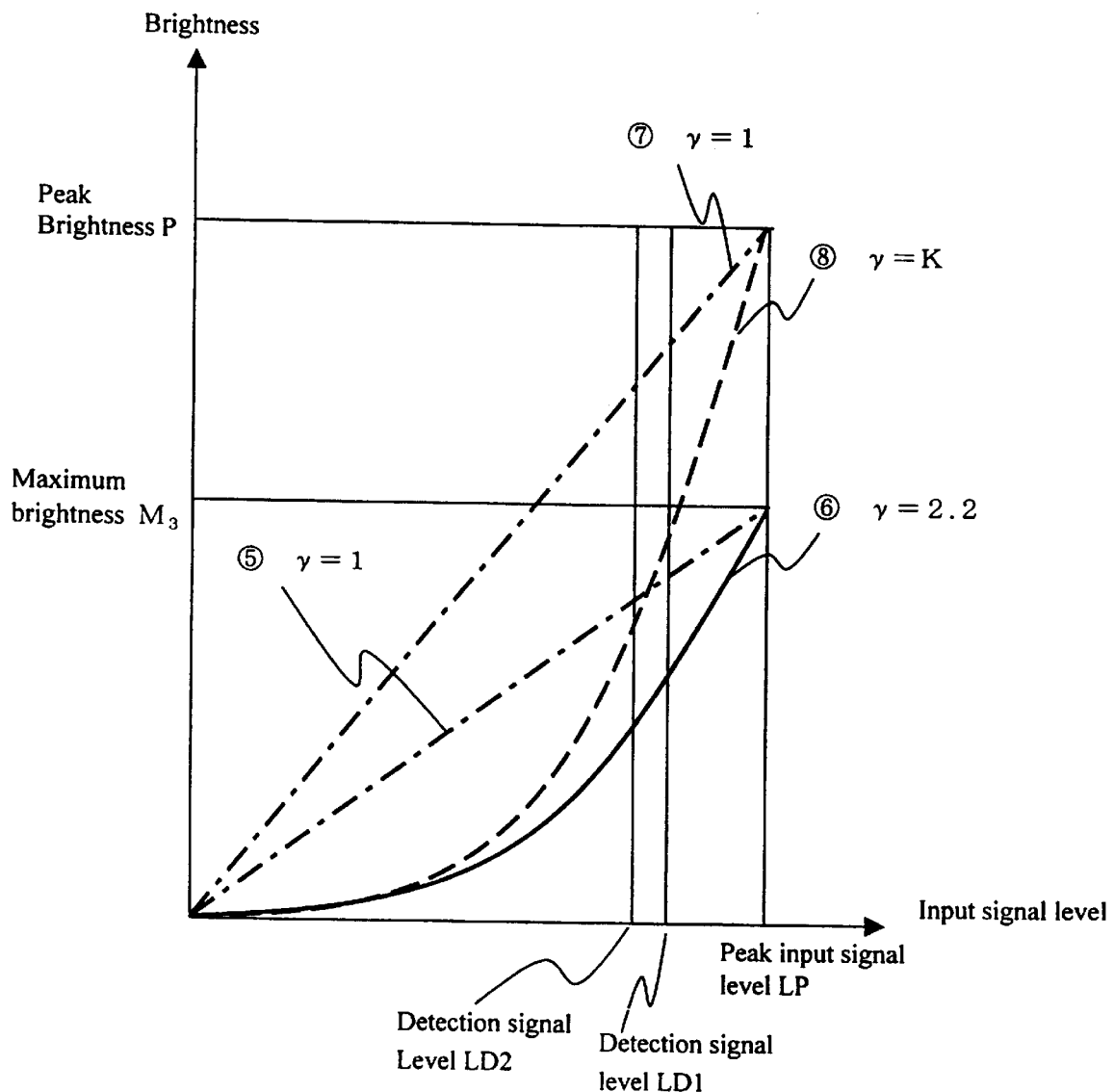
FIG. 14 is a working characteristic diagram representation of a relationship between input signals and brightness on the display of a fourth embodiment of the present invention.
Figure 15:
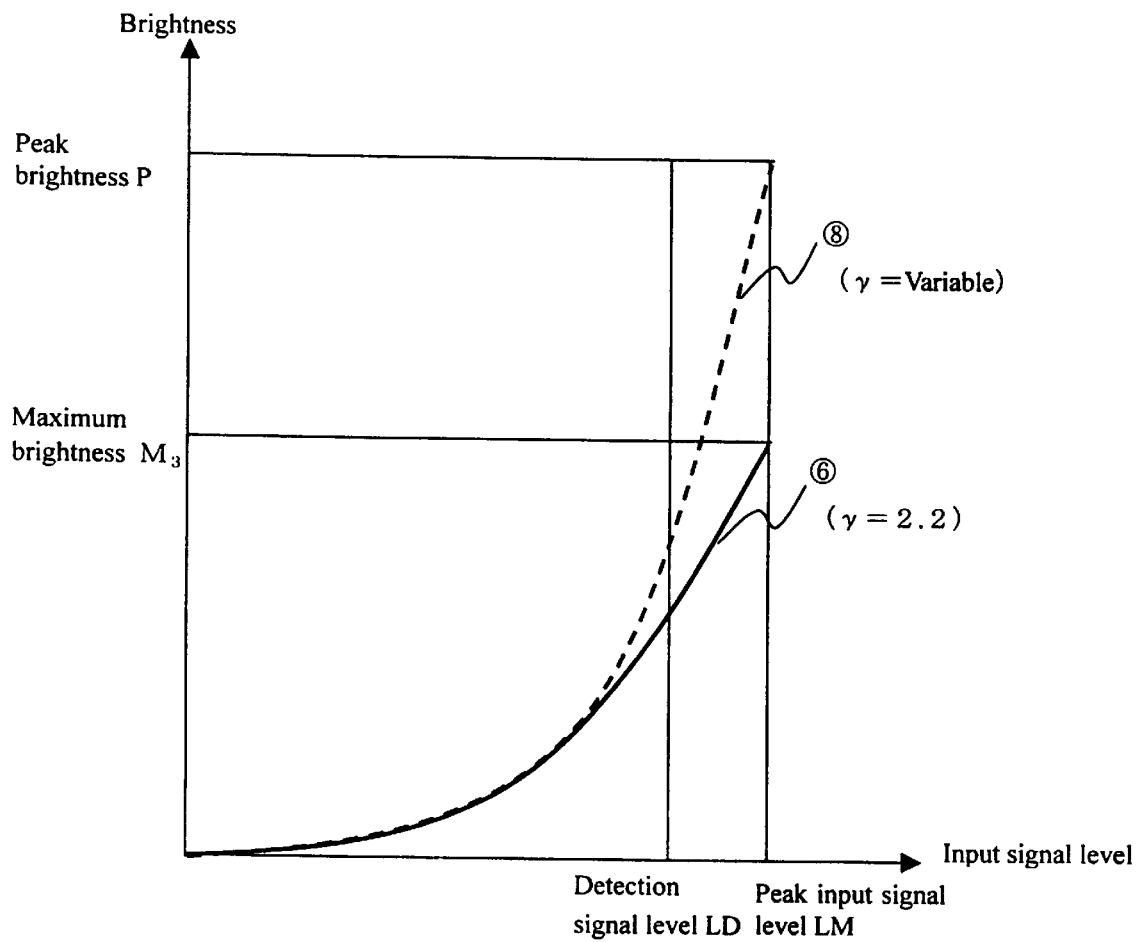
FIG. 15 is another working characteristic diagram representation of a relationship between input signals and brightness on the display of a fourth embodiment of the present invention.

The fourth embodiment of the present invention will be described with reference to FIG. 12 to FIG. 14. This fourth embodiment of the present invention provides the high quality plasma display panel and the method for controlling the brightness even when almost the same level of the TV signal inputs around the detection input signal level LD are continued as shown in FIG. 13.

Figure 12:
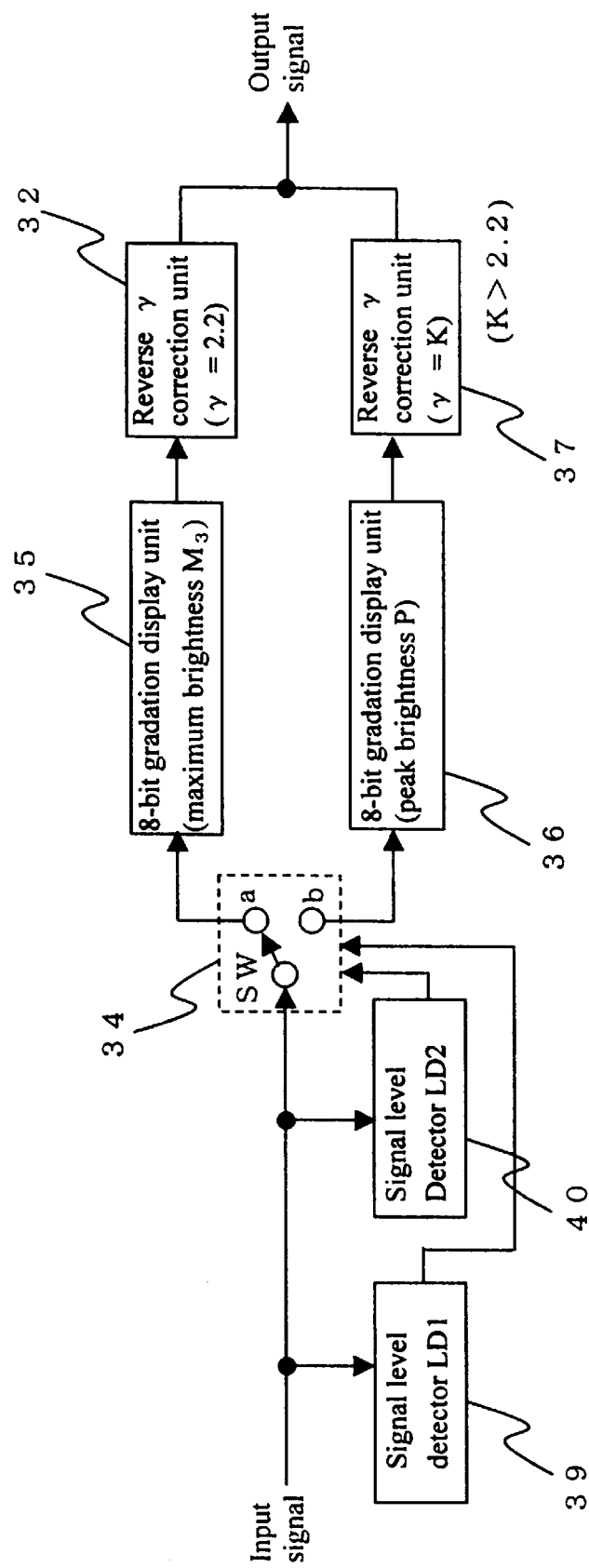
FIG. 12 is a basic configuration diagram representation of a brightness controlling method of a plasma display panel of a fourth embodiment of the present invention.

Referring first to FIG. 12, FIG. 12 is a basic configuration diagram representation of a brightness controlling method of a plasma display panel of a fourth embodiment of the present invention. In this description about the fourth embodiment, the same descriptions as those of the second embodiment are omitted and the descriptions related to the portions different from the second embodiment are described below.

In the second embodiment as shown in FIG. 7, the switch (SW) 34 is switched by detecting the single detection signal level LD as the switching threshold by the signal level detector 33. In the fourth embodiment as shown in FIG. 12, there are two signal level detector 39 and 40 in order to detect the two detection signal levels LD1 and LD2 respectively. The signal level detector 39 detects the input signals when the signals go beyond the detection signal level LD1 and turns the switch (SW) 34 from side a to side b. On the contrary, the signal level detector 40 detects the input signals when the signals drop below the detection signal level LD2 and turns the switch (SW) 34 from side b to side a. As shown in FIG. 13, when almost the same level of TV signal inputs near the detection input signal level LD are continued, chattering from the brightness display will appear on the plasma display panel shown in FIG. 7, corresponding to the chattering of the switching of the characteristics of the brightness display between the solid curved line ⑥ and the dotted curved line ⑧ shown in FIG. 8. In this fourth embodiment, the relationship between the signal level and the brightness display is shown as FIG. 14. There are two detection signal levels LD1 and LD2. The LD1 is the value for switching the weighting of the brightness display and the value of γ for the reverse γ correction to be enhanced, and the LD2 is the value for switching the weighting of the brightness display and the value of γ back. The level of LD1 and LD2 are different. This is to say, the input signal level for switching the characteristics of the brightness display between the solid curved line ⑥ and the dotted curved line ⑧ are varied in order to obtain the hysteresis characteristics at the switching threshold point.

In order to achieve this function, the signal level detector 51 of the driving circuit can detect two levels (LD1 and LD2) in order to obtain the hysteresis characteristics on the driving of the reverse γ correction unit 13 and the timing pulse generator 17. The plasma display panel will achieve the chatter free and stable high brightness display.

In accordance with the above description, the basic number of the weighting bit and sub-fields in one field do not need to be limited to 8 and can vary in order to vary the gradation of the plasma display of the present invention. Furthermore, the method for lengthening the maintaining period of the sub-fields by reducing the number of the sub-fields in a field when switching the characteristics of the brightness display from the solid curved line ⑥ to the dotted curved line ⑧ in order to obtain the peak brightness display can be applicable to the present invention. Moreover, the value K is not limited to a fixed value, the value K can be whether a constant number or a variable number varied by the input signal level.

In accordance with the above description, the plasma display panel is explained as an AC type plasma display panel comprising three electrodes (scanning.maintaining.data electrode). However, this invention is not limited to an AC type plasma display panel. This invention can be applied to all plasma display panels in which sub-fields are used.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A plasma display panel having brightness display ranges, comprising
    a gradation brightness display range which displays a gradation brightness corresponding to input signals of a first input signal range under a preset input signal level; and
    a constant brightness display range which displays a constant brightness obtained by adding a constant brightness value to a maximum brightness value of the gradation brightness display range when the input signal is in a second input signal range greater than the preset input signal level.

2. The plasma display panel according to claim 1, wherein a time limit for continuous displaying of the constant brightness is set.

3. The plasma display panel according to claim 1, which includes a field of scanning signal, the field of scanning signal further comprising
    sub-fields for weighting the brightness display in order to display the gradation brightness in the gradation brightness display range; and
    an additional sub-field independent of the sub-fields for gradation brightness in order to display the constant brightness in the constant brightness display range.

4. The plasma display panel according to claim 2, which includes a field of scanning signal, the field of scanning signal further comprising
    sub-fields for weighting the brightness display in order to display the gradation brightness in the gradation brightness display range; and
    an additional sub-field independent of the sub-fields for gradation brightness in order to display the constant brightness in the constant brightness display range.

5. The plasma display panel according to claim 1, which includes a field of scanning signal, the field of scanning signal further comprising
    sub-fields for weighting the brightness display in order to display the gradation brightness in the gradation brightness display range; and
    an additional sub-field independent of the sub-fields for gradation brightness in order to display the constant brightness in the constant brightness display range, wherein when the input signals go above a preset level, the additional sub-field is added in the field, and when the input signals drop below the preset level, the added additional sub-field is cleared off from the field.

6. The plasma display panel according to claim 5, wherein the timing for varying the number of the sub-fields is delayed in at least one of two cases in which (a) the input signals go over the preset level or (b) the input signals drop below the preset level.

7. The plasma display panel according to claim 5, wherein the value of the preset level for adding the additional sub-field and the value of the preset level for clearing the additional sub-field are different from each other.

8. A plasma display panel having sub-fields for weighting brightness display in a field and a signal processing circuit for reverse $\gamma$ correction wherein
    both a value for the brightness weighting and a value of $\gamma$ for the reverse $\gamma$ correction are enhanced when input signals go beyond a preset level, and both a value for the brightness weighting and a value of $\gamma$ for the reverse $\gamma$ correction are decreased when input signals drop below the preset level.

9. The plasma display panel according to claim 8, wherein the timing for varying the value of the brightness weighting and the value of $\gamma$ are delayed in at least one of two cases in which (a) the input signals go over the preset level or (b) the input signals drop below the preset level.

10. The plasma display panel according to claim 8, wherein the value of the preset level for enhancing the value of the brightness weighting and the value of $\gamma$ and the value of the preset level for decreasing the value of the brightness weighting and the value of $\gamma$ are different from each other.

11. The plasma display panel according to claim 9, wherein the value of the preset level for enhancing the value of the brightness weighting and the value of $\gamma$ and the value of the preset level for decreasing the value of the brightness weighting and the value of $\gamma$ are different from each other.

12. The plasma display panel according to claim 8, wherein a period of continuous display in which the value of the brightness weighting and the value of $\gamma$ are enhanced has a limitation on its length.

13. A method for controlling brightness display on a plasma display panel having brightness display ranges, comprising
    using a gradation brightness display range which displays gradation brightness for input signals of a first input signal range under a preset input signal level; and
    using a constant brightness display range which displays a constant brightness obtained by adding a constant brightness value to a maximum brightness value of the gradation brightness display range when the input signal is in a second input signal range greater than the preset input signal level.

14. The method for controlling brightness display on a plasma display panel according to claim 13, further comprising limiting a period of continuous displaying of the constant brightness.

15. The method for controlling brightness display on a plasma display panel according to claim 13, further comprising using a field of scanning signal that comprises
    sub-fields for weighting the brightness display in order to display the gradation brightness in the gradation brightness display range; and
    an additional sub-field independent of the sub-fields for gradation brightness in order to display the constant brightness in the constant brightness display range.

16. The method for controlling brightness display on a plasma display panel according to claim 14, further comprising using a field of scanning signal that comprises sub-fields for weighting the brightness display in order to display the gradation brightness in the gradation brightness display range; and an additional sub-field independent of the sub-fields for gradation brightness in order to display the constant brightness in the constant brightness display range.

17. The method for controlling brightness display on a plasma display panel according to claim 13, further comprising using a field of scanning signal that comprises sub-fields for weighting the brightness display in order to display the gradation brightness in the gradation brightness display range; and an additional sub-field independent of the sub-fields for gradation display brightness in order to display the constant brightness in the constant brightness display range, wherein when the input signals go beyond a preset level, the additional sub-field is added in the field, when the input signals drop below the preset level, the added additional sub-field is cleared off from the field.

18. The method for controlling brightness display on a plasma display panel according to claim 17, wherein the timing for varying the number of the sub-fields is delayed in at least one of two cases in which (a) the input signals go over the preset level or (b) the input signals drop below the preset level.

19. The method for controlling brightness display on a plasma display panel according to claim 17, wherein the value of the preset level for adding the additional sub-field and the value of the preset level for clearing the additional sub-field are different from each other.

20. A method for controlling brightness display on a plasma display panel having sub-fields for weighting brightness display in a field and a signal processing circuit for reverse $\gamma$ correction wherein both a value for the brightness weighting and a value of $\gamma$ for the reverse $\gamma$ correction are enhanced when input signals go beyond a preset level, and both a value for the brightness weighting and a value of $\gamma$ for the reverse $\gamma$ correction are decreased when input signals drop below the preset level.

21. The method for controlling brightness display on a plasma display panel according to claim 20, wherein the timing for varying the value of the brightness weighting and the value of $\gamma$ is delayed in at least one of two cases in which (a) the input signals go over the preset level or (b) the input signals drop below the preset level.

22. The method for controlling brightness display on a plasma display panel according to claim 20, wherein the value of the preset level for enhancing the value of the brightness weighting and the value of $\gamma$ and the value of the preset level for decreasing the value of the brightness weighting and the value of $\gamma$ are different from each other.

23. The method for controlling brightness display on a plasma display panel according to claim 21, wherein the value of the preset level for enhancing the value of the brightness weighting and the value of $\gamma$ and the value of the preset level for decreasing the value of the brightness weighting and the value of $\gamma$ are different from each other.

24. The method for controlling brightness display on a plasma display panel according to claim 20, further comprising limiting a period of continuous display in which the value of the brightness weighting and the value of $\gamma$ are enhanced.

* * * * *